United States Patent
Yamashita et al.

(10) Patent No.: US 11,890,937 B2
(45) Date of Patent: Feb. 6, 2024

(54) VEHICLE DRIVE TRANSMISSION DEVICE AND VEHICLE DRIVE DEVICE INCLUDING SAME

(71) Applicant: AISIN FUKUI CORPORATION, Echizen (JP)

(72) Inventors: Shingo Yamashita, Kariya (JP); Kenta Tamabayashi, Echizen (JP); Yu Takizawa, Echizen (JP); Hiromasa Hayashi, Echizen (JP)

(73) Assignee: AISIN FUKUI CORPORATION, Echizen (JP)

( * ) Notice: Subject to any disclaimer, the term of this patent is extended or adjusted under 35 U.S.C. 154(b) by 0 days.

(21) Appl. No.: 17/773,707

(22) PCT Filed: Oct. 29, 2020

(86) PCT No.: PCT/JP2020/040658
§ 371 (c)(1),
(2) Date: May 2, 2022

(87) PCT Pub. No.: WO2021/085538
PCT Pub. Date: May 6, 2021

(65) Prior Publication Data
US 2022/0379710 A1 Dec. 1, 2022

(30) Foreign Application Priority Data
Oct. 30, 2019 (JP) .................................. 2019-197529

(51) Int. Cl.
*B60K 6/387* (2007.10)
*B60K 6/40* (2007.10)
(Continued)

(52) U.S. Cl.
CPC ................ *B60K 6/387* (2013.01); *B60K 6/40* (2013.01); *B60K 6/48* (2013.01); *F16D 25/0638* (2013.01)

(58) Field of Classification Search
CPC ..... F16D 2021/0692; F16D 2021/0676; F16D 13/38; F16D 13/52; F16D 13/58;
(Continued)

(56) References Cited

U.S. PATENT DOCUMENTS

2004/0154893 A1    8/2004  Braford, Jr.
2006/0144665 A1*   7/2006  Janson .................... F16D 25/10
                                                          192/48.8
(Continued)

FOREIGN PATENT DOCUMENTS

EP    3 540 269 A1    9/2019
JP    2008-025753 A   2/2008
(Continued)

OTHER PUBLICATIONS

May 3, 2022 International Preliminary Report on Patentasbility issued in International Patent Application No. PCT/JP2020/040658.
(Continued)

*Primary Examiner* — Jacob S. Scott
*Assistant Examiner* — Farhana Pervin
(74) *Attorney, Agent, or Firm* — Oliff PLC

(57) ABSTRACT

A first support is open toward a first side in an axial direction. A press member is at such a position as to press a first friction plate and second friction plate of a friction clutch device from the first side in the axial direction. An intermediate member includes a body between the press member and a second support in the axial direction and a protrusion protruding toward the first side of the body in the axial direction. The press member has an insertion hole
(Continued)

extending through the press member in the axial direction and configured to receive the protrusion.

12 Claims, 7 Drawing Sheets

(51) Int. Cl.
*B60K 6/48* (2007.10)
*F16D 25/0638* (2006.01)

(58) Field of Classification Search
CPC .... F16D 55/02; F16D 11/14; F16D 2011/002; F16D 2125/64; F16D 25/0638; F16D 2021/0661; F16D 13/70; F16D 25/12; B60K 6/387; B60K 6/40; B60K 6/48; B60K 6/543; B60K 6/547; B60K 2006/4825
See application file for complete search history.

(56) References Cited

U.S. PATENT DOCUMENTS

| | | | |
|---|---|---|---|
| 2009/0000896 A1* | 1/2009 | Knowles | F16D 25/0638 903/902 |
| 2015/0114779 A1* | 4/2015 | Frait | F16D 47/06 192/3.25 |
| 2019/0257371 A1 | 8/2019 | Yamakawa et al. | |
| 2019/0301592 A1* | 10/2019 | Van Bakel | F16H 57/082 |

FOREIGN PATENT DOCUMENTS

| | | | | |
|---|---|---|---|---|
| JP | 2015-123813 A | 7/2015 | | |
| JP | 2016-070432 A | 5/2016 | | |
| JP | 2017-166583 A | 9/2017 | | |
| WO | WO-2015108147 A1 * | 7/2015 | | B60K 6/383 |
| WO | 2017/057190 A1 | 4/2017 | | |
| WO | WO-2018181352 A1 * | 10/2018 | | B60K 17/04 |

OTHER PUBLICATIONS

Nov. 18, 2022 Extended European Search Report issued in European Application No. 20882071.2.
Dec. 15, 2020 Search Report issued in International Patent Application No. PCT/JP2020/040658.

\* cited by examiner

VEHICLE DRIVE TRANSMISSION DEVICE AND VEHICLE DRIVE DEVICE INCLUDING SAME

TECHNICAL FIELD

The present invention relates to (i) a vehicle drive transmission device including first friction plates and second friction plates arranged in an axial direction and a friction clutch device including a press member configured to press the first friction plates and the second friction plates in the axial direction and (ii) a vehicle drive device including the vehicle drive transmission device.

BACKGROUND ART

An example of the above vehicle drive device is disclosed in Patent Literature 1 below. The description below of the background art shows parentheses to indicate the reference signs used in Patent Literature 1.

Patent Literature 1 discloses a device (1) including a friction clutch device (CL1) with friction members (41) and also including an outer support (51) supporting the friction members (41) from the outer side (R2) in a radial direction (R). The friction clutch device (CL1) includes a press member (57) supported by the outer support (51) in such a manner as to rotate integrally with the outer support (51). Specifically, the outer support (51) includes at an inner circumferential portion thereof a plurality of splines extending in an axial direction (L) and separated from one another in a circumferential direction (C). The press member (57) also each include similar splines at an outer circumferential portion thereof. The two sets of splines are engaged with each other, so that the press member (57) is restricted in its rotation relative to the outer support (51), and is supported by the outer support (51) in such a manner as to be slidable in the axial direction (L).

CITATION LIST

Patent Literature

Patent Literature 1
International Publication No. 2017/057190 (FIG. 3)

SUMMARY OF INVENTION

Technical Problem

The device (1) of Patent Literature 1 is configured such that the outer support (51) is open toward a first side (L1) in the axial direction (L). Producing the device (1) of Patent Literature 1 involves assembling the press member (57) to the outer support (51) through the opening thereof from the first side (L1) in the axial direction (L). This assembly work requires an assembler to engage the splines of the press member (57) with those of the outer support (51). If, for instance, the splines are so positioned as to be difficult to see, the assembler needs to press the press member (57) against the outer support (51) in the axial direction (L) and simultaneously rotate the press member (57) relative to the outer support (51) until the two sets of splines match in phase. This need to rotate the press member (57) to allow the two sets of splines to match in phase has made the assembly of the press member (57) troublesome.

The above circumstances have led to a demand for a vehicle drive transmission device including an easily assemblable press member and a vehicle drive device including the vehicle drive transmission device.

Solution to Problem

In view of the above, a vehicle drive transmission device characteristically includes:
  a first friction plate and a second friction plate arranged in an axial direction; a friction clutch device including a press member configured to press the first friction plate and the second friction plate in the axial direction;
  a first support supporting the first friction plate from an outer side in a radial direction;
  a second support supporting the first friction plate from an inner side in the radial direction; and
  an intermediate member coupled to the second support in such a manner as to rotate integrally with the second support, wherein
  the first support is open toward a first side in the axial direction,
  the press member is at such a position as to press the first friction plate and the second friction plate from the first side in the axial direction,
  the intermediate member includes: a body between the press member and the second support in the axial direction; and a protrusion protruding toward the first side of the body in the axial direction; and p the press member has an insertion hole extending through the press member in the axial direction and configured to receive the protrusion.

The above vehicle drive transmission device is characteristically configured such that the intermediate member includes a body and a protrusion protruding toward the first side of the body in the axial direction and that the press member has an insertion hole extending through the press member in the axial direction and configured to receive the protrusion. With the protrusion in the insertion hole, the press member is restricted in its rotation relative to the second support. The use of the protrusion and the insertion hole appropriately restricts rotation of the press member and the second support relative to each other. Further, when the press member is assembled to the intermediate member from the first side in the axial direction, the assembler is able to see, from the first side in the axial direction through the insertion hole in the press member, the protrusion to be inserted into the insertion hole. The above configuration thereby allows the assembler to easily adjust the rotation phase of the press member and insert the protrusion into the insertion hole, facilitating the assembly of the press member.

In view of the above, a vehicle drive transmission device characteristically includes:
  a first friction plate and a second friction plate arranged in an axial direction; a friction clutch device including a press member configured to press the first friction plate and the second friction plate in the axial direction;
  a first support supporting the first friction plate from an outer side in a radial direction; and
  a second support supporting the first friction plate from an inner side in the radial direction, wherein
  the first support is open toward a first side in the axial direction,
  the second support includes: a cylindrical support section extending in the axial direction and supporting the second friction plate; and a radial extension section extending in the radial direction on an inner side of the cylindrical support section in the radial direction and coupled to the cylindrical support section, the press member is at such a position as to press the first friction plate and the second friction plate from the first side in the axial direction, the second support further includes a protrusion protruding from the cylindrical support section toward the first side in the axial direction, and the press member has an insertion hole extending through the press member in the axial direction and configured to receive the protrusion.

The above vehicle drive transmission device is characteristically configured such that the second support includes a cylindrical support section and a protrusion protruding from the cylindrical support section toward the first side in the axial direction and that the press member has an insertion hole extending through the press member in the axial direction and configured to receive the protrusion. With the protrusion in the insertion hole, the press member is restricted in its rotation relative to the second support. The use of the protrusion and the insertion hole appropriately restricts rotation of the press member and the second support relative to each other. Further, when the press member is assembled to the second support from the first side in the axial direction, the assembler is able to see, from the first side in the axial direction through the insertion hole in the press member, the protrusion to be inserted into the insertion hole. The above configuration thereby allows the assembler to easily adjust the rotation phase of the press member and insert the protrusion into the insertion hole, facilitating the assembly of the press member.

DESCRIPTION OF EMBODIMENTS

Figure 1:
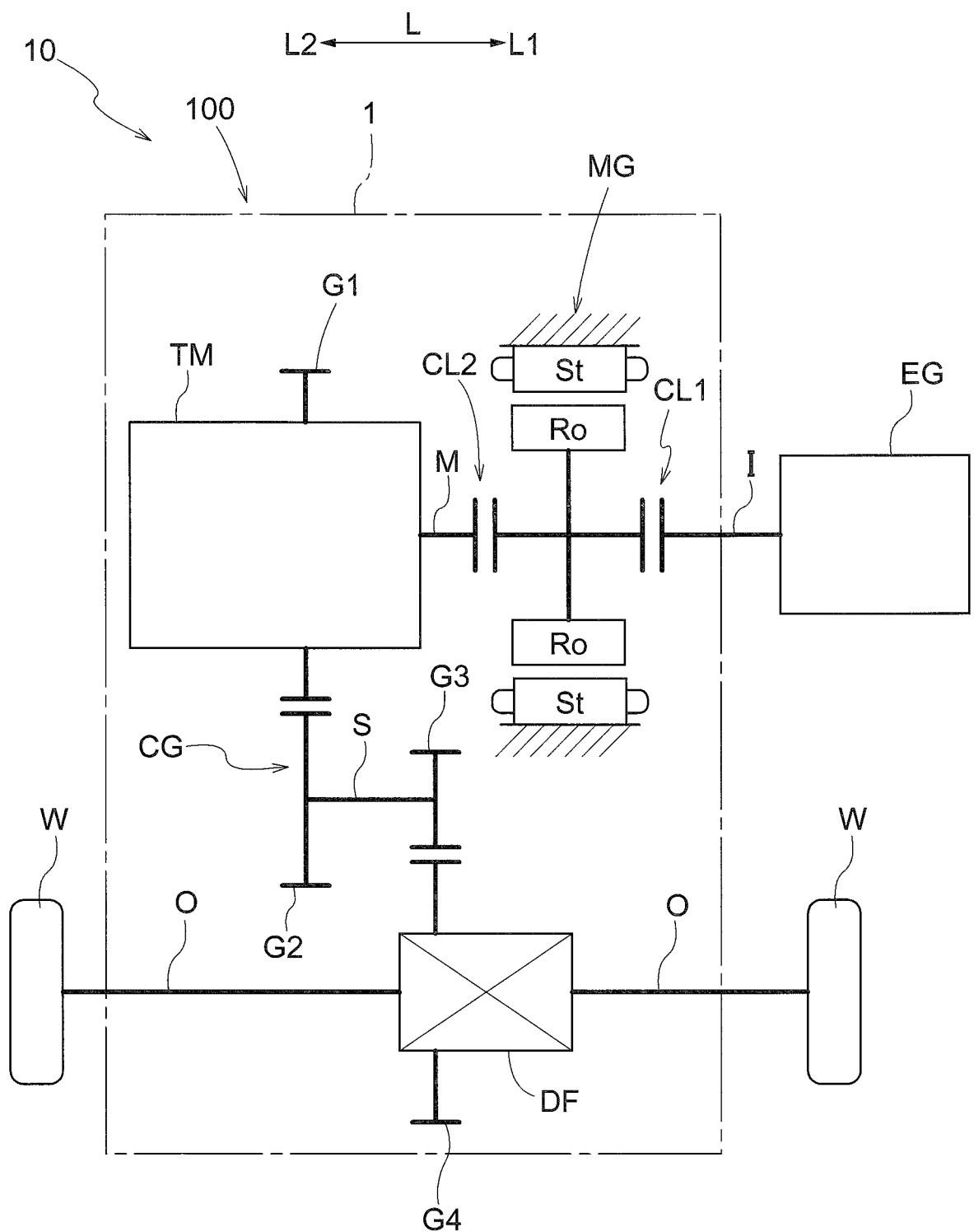
FIG. 1 is a diagram schematically illustrating the configuration of a vehicle drive device as an embodiment.

The description below deals with a vehicle drive device 10 as an embodiment with reference to drawings. As illustrated in FIG. 1, the vehicle drive device 10 is for use to drive a vehicle including both an internal combustion engine EG and a rotary electric machine MG (that is, a hybrid vehicle). Specifically, the vehicle drive device 10 serves to drive a single-motor parallel hybrid vehicle.

The description below uses the terms "axial direction L", "radial direction R", and "circumferential direction C" relative to the rotation axis of the rotary electric machine MG unless otherwise specified. The description below also uses the term "radially inner side R1" to refer to that side in the radial direction R on which the rotation axis of the rotary electric machine MG is present and the term "radially outer side R2" to refer to that side in the radial direction R which is opposite to the above side.

The respective orientations of different parts described below are of those parts as assembled into the vehicle drive device 10. Further, the terms related to, for example, the respective orientations and positions of different parts described below each cover in its conceptual scope a state involving a production tolerance.

As illustrated in FIG. 1, the vehicle drive device 10 includes a vehicle drive transmission device 100 and a rotary electric machine MG. The vehicle drive transmission device 100 includes a first clutch device CL1. The vehicle drive transmission device 100 for the present embodiment further includes a second clutch device CL2, an input member I, a transmission TM, a counter gear mechanism CG, a differential gear mechanism DF. and a pair of output members O. The vehicle drive device 10 as the present embodiment includes a case 1 containing a portion of the input member I, a portion of each output member O, the first clutch device CL1, the second clutch device CL2, the rotary electric machine MG, the transmission TM, the counter gear mechanism CG, and the differential gear mechanism DF.

The rotary electric machine MG serves as a driving source for wheels W of the vehicle. The rotary electric machine MG serves as an electric motor configured to receive electric power and generate motive power and also as a generator configured to receive motive power and generate electric power. For that purpose, the rotary electric machine MG is electrically connected to an electricity storage device (such as a battery or capacitors). The rotary electric machine MG runs on electric power from the electricity storage device, and also supplies the electricity storage device with electric power for storage which is generated by the torque of the internal combustion engine EG or the inertial force of the vehicle.

The internal combustion engine EG serves as a driving source for the wheels W similarly to the rotary electric machine MG. The internal combustion engine EG is a prime mover drivable through fuel combustion to take out motive power (such as a gasoline engine or a diesel engine).

The input member I is drive-coupled to the internal combustion engine EG. The input member I for the present embodiment is drive-coupled to the output shaft (such as a crank shaft) of the internal combustion engine EG with a damper device (not illustrated in the drawings) therebetween that is configured to attenuate variation of torque being transmitted.

The expression "drive-coupled" as used herein refers to the state of two rotary elements being coupled to each other in such a manner as to allow transmission of driving force from one to the other. The state may be of two rotary elements being coupled to each other in such a manner as to rotate integrally or allow transmission of driving force from one to the other with one or more power transmission members therebetween. Such power transmission members are each any of various members configured to transmit rotation while keeping or varying its speed, such as a shaft, a gear mechanism, a belt, and a chain. The power transmission members may include a clutch device configured to selectively transmit rotation and driving force, such as a friction clutch device or an engaging clutch device.

Figure 2:
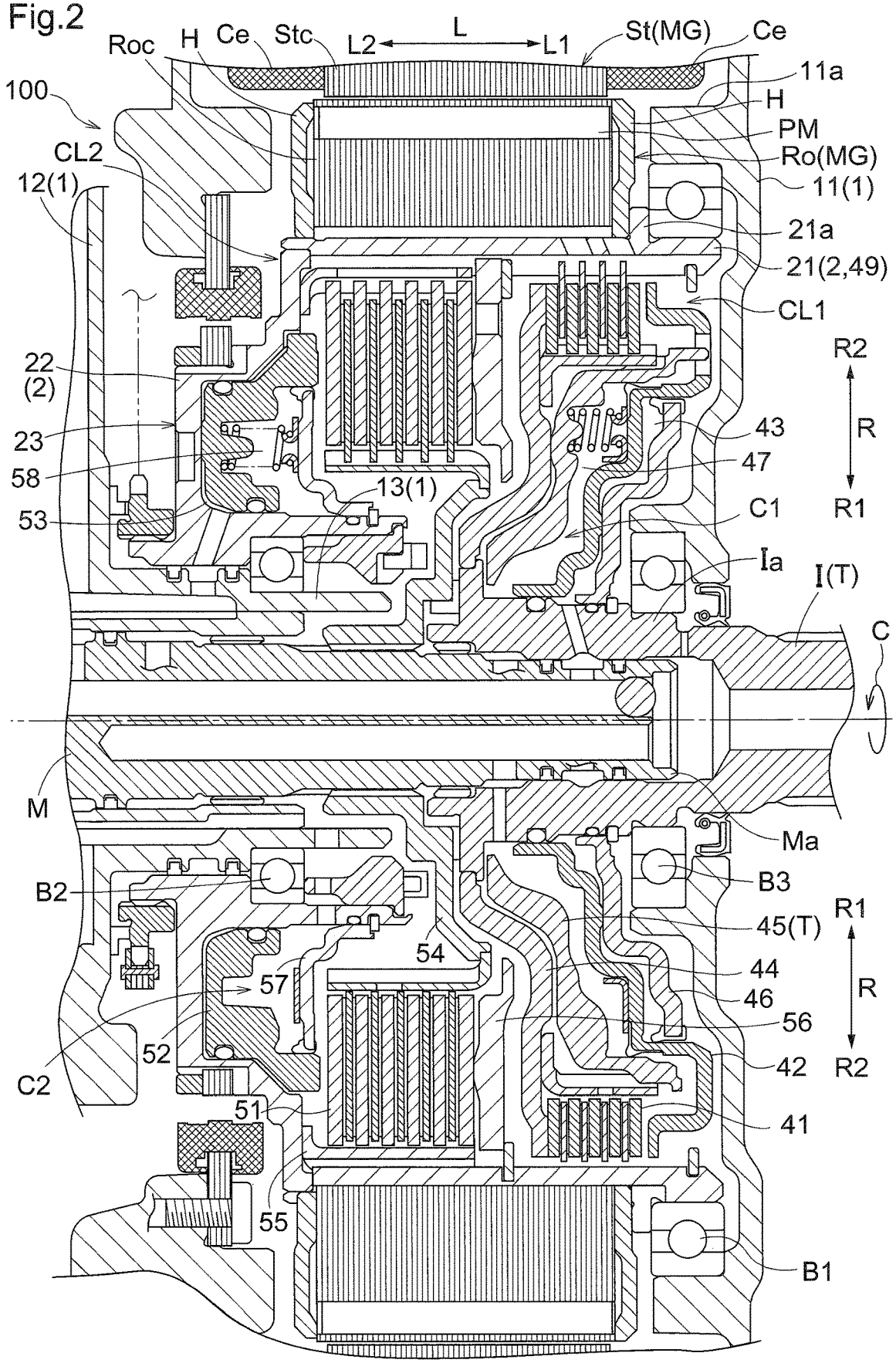
FIG. 2 is a partial cross-sectional view of a vehicle drive device as an embodiment.

The first clutch device CL1 and the second clutch device CL2 each serve to enable and disable transmission of motive power from one of two rotary elements to the other. As illustrated in FIG. 2, the first clutch device CL1 and the second clutch device CL2 for the present embodiment are arranged in the axial direction L. The rotary electric machine MG and the transmission TM for the present embodiment are also arranged in the axial direction L. The second clutch device CL2 is on that side in the axial direction L on which the transmission TM is present relative to the first clutch device CL1.

The description below uses the term "axial-direction first side L1" to refer to that side in the axial direction L on which the first clutch device CL1 is present relative to the second clutch device CL2 and the term "axial-direction second side L2" to refer to that side in the axial direction L which is opposite to the axial-direction first side L1.

As illustrated in FIG. 1, the first clutch device CL1 for the present embodiment is on a motive power transmission path between the input member I and the rotary electric machine MG. The first clutch device CL1 thus serves to couple the input member I and the rotary electric machine MG to each other or uncouple the input member I and the rotary electric machine MG from each other. The first clutch device CL1 for the present embodiment is controlled in terms of its engagement state (namely, direct engagement, slip engagement, or disengaged) in response to the hydraulic pressure applied to the first clutch device CL1.

The second clutch device CL2 for the present embodiment is on a motive power transmission path between the rotary electric machine MG and the transmission TM. The second clutch device CL2 serves to couple an input transmission shaft M, which is an input element of the transmission TM, and the rotary electric machine MG to each other or uncouple the input transmission shaft M and the rotary electric machine MG from each other. The second clutch device CL2 for the present embodiment is controlled in terms of its engagement state (namely, direct engagement, slip engagement, or disengaged) in response to the hydraulic pressure applied to the second clutch device CL2.

The transmission TM serves to change the speed of rotation transmitted from the rotary electric machine MG. Specifically, the transmission TM changes the speed of rotation inputted to the input transmission shaft M at the current speed-change ratio, and converts the torque inputted to the input transmission shaft M. The transmission TM then transmits the resulting rotation and torque to an output transmission gear G1, which is an output element of the transmission TM. The transmission TM for the present embodiment is an automatic stepped transmission that includes a plurality of transmission engagement devices and that is switchable between a plurality of gear positions with respective speed-change ratios different from each other. The transmission TM may alternatively be, for example, an automatic stepless transmission having a steplessly changeable speed-change ratio or a manual stepped transmission switchable between a plurality of gear positions with respective speed-change ratios different from each other.

The counter gear mechanism CG includes an input counter gear G2 and an output counter gear G3. The input counter gear G2 is an input element of the counter gear mechanism CG, and meshes with the output transmission gear G1. The output counter gear G3 is an output element of the counter gear mechanism CG, and is coupled to the input counter gear G2 in such a manner as to rotate integrally with the input counter gear G2. The output counter gear G3 for the present embodiment is coupled to the input counter gear G2 with a counter shaft S therebetween that extends in the axial direction L. The output counter gear G3 is on the axial-direction first side L1 of the input counter gear G2 as in the illustrated example.

The differential gear mechanism DF includes an input differential gear G4 that meshes with the output counter gear G3 of the counter gear mechanism CG. The differential gear mechanism DF The differential gear mechanism DF divides rotation of the input differential gear G4 and transmits the resulting rotations to the respective output members O, which are drive-coupled to the respective wheels W.

The vehicle drive device 10 configured as above allows the engagement state of each of the first clutch device CL1 and the second clutch device CL2 to be switched in order for either or both of the internal combustion engine EG and the rotary electric machine MG to transmit torque to the wheels W and thereby for the vehicle to travel. The vehicle drive device 10 as the present embodiment has a multi-axis configuration: The input member I is coaxial with the input transmission shaft M, and the pair of output members O are on a different axis and parallel to the input member I and the input transmission shaft M. The vehicle drive device 10 configured as such is suitable for an FF (front engine front drive) vehicle, for example.

The vehicle drive device 10 allows the internal combustion engine EG to be started with use of driving force of the rotary electric machine MG with the first clutch device CL1 directly engaged and the second clutch device CL2 slip-engaged to prevent the torque fluctuation at the start of the internal combustion engine EG from being transmitted to the wheels W. The expression "directly engaged" refers to an engagement state involving no rotation speed difference (slip) between a pair of friction plates of a friction clutch device. The expression "slip-engaged" refers to an engagement state involving a rotation speed difference (slip) between a pair of friction plates of a friction clutch device.

As illustrated in FIG. 2, the case 1 for the present embodiment includes a first side wall 11, a second side wall 12, and a cylindrical protrusion 13. The case 1 for the present embodiment also includes a round wall (not illustrated in the drawings) disposed between the first side wall 11 and the second side wall 12 in the axial direction L and covering the rotary electric machine MG from the radially outer side R2.

The first side wall 11 extends in the radial direction R, and is on the axial-direction first side L1 of the rotary electric machine MG and the first clutch device CL1. The input member I extends through the first side wall 11 in the axial direction L. The input member I includes on the axial-direction first side L1 of the first side wall 11 a portion coupled to the damper device mentioned above.

The second side wall 12 extends in the radial direction R, and is on the axial-direction second side L2 of the rotary electric machine MG and the second clutch device CL2. The input transmission shaft M extends through the second side wall 12 in the axial direction L.

The cylindrical protrusion 13 protrudes from the second side wall 12 in the axial direction L. The cylindrical protrusion 13 for the present embodiment protrudes from the second side wall 12 toward the axial-direction first side L1. Further, the cylindrical protrusion 13 covers the input transmission shaft M on the radially outer side R2. The cylindrical protrusion 13 for the present embodiment has on the axial-direction first side L1 an end portion that is on the axial-direction second side L2 of that end portion of the input member I which is on the axial-direction second side L2. The cylindrical protrusion 13 is, in other words, apart from the input member I in the axial direction L.

The input member I for the present embodiment includes a cylindrical input section Ia that is open toward one side in the axial direction L (for the present embodiment, the axial-direction second side L2). The input transmission shaft M includes an insert portion Ma inserted in the cylindrical input section Ia on the radially inner side R1. The input member I and the input transmission shaft M are rotatable relative to each other with the insert portion Ma in the cylindrical input section Ia.

As illustrated in FIG. 2, the rotary electric machine MG includes a stator St and a rotor Ro on the radially inner side R1 of the stator St. The stator St is fixed to a non-rotatable member. The stator St for the present embodiment is fixed to the first side wall 11 of the case 1 with use of fixing members such as bolts. The stator St for the present embodiment includes a stator core Stc and a coil wound around the stator core Stc to form coil end portions Ce protruding from the stator core Stc on both sides in the axial direction L (namely, on the axial-direction first side L1 and the axial-direction second side L2). The rotor Ro is rotatable relative to the stator St. The rotor Ro for the present embodiment includes a rotor core Roc, a pair of holding members H holding the rotor core Roc on opposite sides in the axial direction L, and a permanent magnet PM inside the rotor core Roc. The stator core Stc and rotor core Roc for the present embodiment each include a plurality of ring-shaped magnetic plates (for example, electromagnetic steel plates) disposed on one another in the axial direction L.

The vehicle drive transmission device 100 for the present embodiment includes a rotor support 2 supporting the rotor Ro. The rotor support 2 includes a cylindrical portion 21 and a flange portion 22.

The cylindrical portion 21 extends in the axial direction L, and is on the radially outer side R2 of the first clutch device CL1. The cylindrical portion 21 for the present embodiment is on the radially outer side R2 of the first clutch device CL1 and the second clutch device CL2. The cylindrical portion 21 supports the rotor Ro from the radially inner side R1, and is coupled to the rotor Ro in such a manner as to rotate integrally with the rotor Ro. The cylindrical portion 21 for the present embodiment has a peripheral surface to which the rotor Ro is attached. The rotor Ro is, for example, welded or swaged to the peripheral surface of the cylindrical portion 21 for attachment.

The flange portion 22 extends from the cylindrical portion 21 in the radial direction R toward the radially inner side R1. The flange portion 22 is on the axial-direction second side L2 of the first clutch device CL1. The flange portion 22 for the present embodiment is on the axial-direction second side L2 of the second clutch device CL2, and is adjacent to the second clutch device CL2. The flange portion 22 for the present embodiment is on the axial-direction first side L1 of the second side wall 12. The flange portion 22 for the present embodiment is a ring-shaped plate extending in the radial direction R and the circumferential direction C.

The flange portion 22 is coupled to the cylindrical portion 21 in such a manner as to rotate integrally with the cylindrical portion 21. The flange portion 22 for the present embodiment is a member separate from the cylindrical portion 21, and is welded, swaged, or otherwise joined to the cylindrical portion 21. The cylindrical portion 21 and the flange portion 22 are, in other words, separate members joined to each other. The flange portion 22 and the cylindrical portion 21 are, in the illustrated example, welded to each other in such a manner that the flange portion 22 includes on the radially outer side R2 an end portion coupled to that end portion of the cylindrical portion 21 which is on the axial-direction second side L2.

The first clutch device CL1 is on the radially inner side R1 of the cylindrical portion 21 and on the axial-direction first side L1 of the flange portion 22. The rotor support 2 defines a space for the first clutch device CL1 on the radially inner side R1 of the cylindrical portion 21 and on the axial-direction first side L1 of the flange portion 22. The rotor support 2 is thus in the shape of a bottomed cylinder that is open toward the axial-direction first side L1. The second clutch device CL2 for the present embodiment is between the first clutch device CL1 and the flange portion 22 in the axial direction L. The first clutch device CL1 and the second clutch device CL2 are, as mentioned above, arranged in the axial direction L. The second clutch device CL2 is thus on the axial-direction second side L2 of the first clutch device CL1, and is adjacent to the first clutch device CL1.

The first clutch device CL1 and second clutch device CL2 for the present embodiment are on the radially inner side R1 of the rotor Ro, and coincide with the rotor Ro as viewed in the radial direction R. The expression "on the radially inner side R1 of X" indicates that something is on the inner side of X in the radial direction R regardless of the position in the axial direction L. A similar definition applies to the expression "on the radially outer side R2 of X". Further, if two elements are described herein as coinciding with each other as viewed in a particular direction, it means that a virtual straight line in that direction remains through both of the two elements as it is moved in either direction orthogonal to the virtual straight line.

Figure 3:
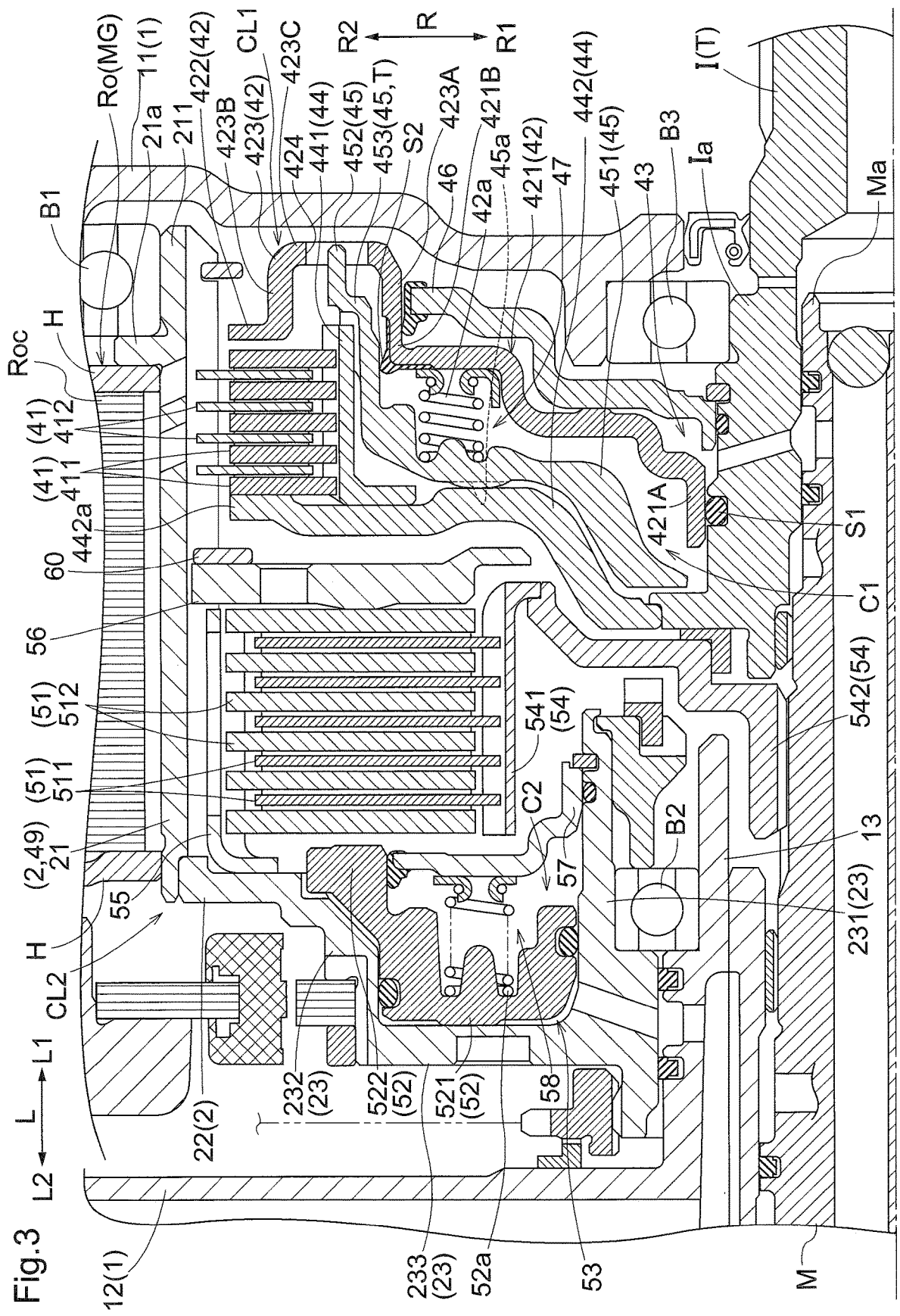
FIG. 3 is an enlarged partial cross-sectional view of a vehicle drive device as an embodiment.

As illustrated in FIG. 3, the first clutch device CL1 is a friction clutch device including first inner friction members 411 and first outer friction members 412 arranged in the axial direction L as well as a first piston 42 configured to press the first inner friction members 411 and the first outer friction members 412 in the axial direction L. The first clutch device CL1 for the present embodiment further includes a first operating oil chamber 43 configured to receive oil for operating the first piston 42 and an oil chamber forming member 46 extending from the input member I toward the radially outer side R2 and coupled to the input member I in such a manner as to rotate integrally with the input member I.

The first inner friction members 411 and the first outer friction members 412 are each in the shape of a ring-shaped plate, and share the same rotation axis. Further, the first inner friction members 411 and the first outer friction members 412 are arranged alternately in the axial direction L. The first inner friction members 411 and the first outer friction members 412 may be such that one of the former and the latter serves as friction plates while the other serves as separate plates. The description below may use the term "first friction members 41" to collectively refer to the first inner friction members 411 and the first outer friction members 412.

The first outer friction members 412 correspond to the "first friction plates". The first outer friction members 412 are supported by a first outer support 49. The first outer support 49 corresponds to the "first support", which supports the first outer friction members 412 from the radially outer side R2. The first outer support 49 is open toward the axial-direction first side L1. The first outer support 49 is rotatable integrally with the cylindrical portion 21. The first outer support 49 for the present embodiment is integral with the cylindrical portion 21. The cylindrical portion 21 in the illustrated example includes at an inner circumferential portion thereof a plurality of splines extending in the axial direction L over the entire area in the axial direction L and separated from one another in the circumferential direction C. The first outer friction members 412 also each include similar splines at an outer circumferential portion thereof. The two sets of splines are engaged with each other, so that the first outer friction members 412 are supported by the cylindrical portion 21 from the radially outer side R2. The first outer friction members 412 are thus restricted in its rotation relative to the cylindrical portion 21, and are supported by the cylindrical portion 21 in such a manner as to be slidable in the axial direction L.

The first inner friction members 411 correspond to the "second friction plates". The first inner friction members 411 are supported by a first inner support 44. The first inner support 44 corresponds to the "second support", which supports the first inner friction members 411 from the radially inner side R1. The first inner support 44 includes a first cylindrical support section 441 and a first radial extension section 442.

The first cylindrical support section 441 corresponds to the "cylindrical support section", which extends in the axial direction L and which supports the first inner friction members 411. The first cylindrical support section 441 supports the first inner friction members 411 from the radially inner side R1. The first cylindrical support section 441 in the illustrated example includes at an outer circumferential portion thereof a plurality of splines extending in the axial direction L over the entire area in the axial direction L and separated from one another in the circumferential direction C. The first inner friction members 411 also each include similar splines at an inner circumferential portion thereof. The two sets of splines are engaged with each other, so that the first inner friction members 411 are supported by the first cylindrical support section 441 from the radially inner side R1. The first inner friction members 411 are thus restricted in its rotation relative to the first cylindrical support section 441, and are supported by the first cylindrical support section 441 in such a manner as to be slidable in the axial direction L.

The first radial extension section 442 corresponds to the "radial extension section", which extends in the radial direction R on the radially inner side R1 of the first cylindrical support section 441 and which is coupled to the first cylindrical support section 441. The first radial extension section 442 is coupled to the first cylindrical support section 441 in such a manner as to rotate integrally with the first cylindrical support section 441. The first radial extension section 442 for the present embodiment is a member separate from the first cylindrical support section 441, and is welded, swaged, or otherwise joined to the first cylindrical support section 441. The first radial extension section 442 and first cylindrical support section 441 in the illustrated example are welded to each other with the first radial extension section 442 having on the axial-direction first side L1 a surface in contact with that surface of the first cylindrical support section 441 which is on the axial-direction second side L2. The first radial extension section 442 is coupled to the input member I in such a manner as to rotate integrally with the input member I. The first radial extension section 442 for the present embodiment includes on the radially inner side R1 an end portion coupled to the outer peripheral surface of the input member I. The first radial extension section 442 in the illustrated example includes on the radially inner side R1 an end portion welded to a flange-shaped protrusion at the outer peripheral surface of the input member I. The first radial extension section 442 for the present embodiment is a ring-shaped plate extending in the radial direction R and the circumferential direction C.

The first clutch device CL1 for the present embodiment includes a contact portion 442a in contact with a first friction member 41 from that side in the axial direction L which is opposite to the first piston 42 (for the present embodiment, from the axial-direction second side L2). The contact portion 442a in the illustrated example is integral with the first radial extension section 442. Specifically, the contact portion 442a corresponds to a portion of the first radial extension section 442 which portion extends farther on the radially outer side R2 than the first cylindrical support section 441. The contact portion 442a for the present embodiment is in contact, from the axial-direction second side L2, with a first inner friction member 411 furthermost on the axial-direction second side L2.

The first inner support 44 is coupled to an intermediate member 45. The intermediate member 45 is coupled to the first inner support 44 in such a manner as to rotate integrally with the first inner support 44. The intermediate member 45 for the present embodiment is on the radially inner side R1 of the first cylindrical support section 441, and coincides with the first cylindrical support section 441 as viewed in the radial direction R.

The intermediate member 45 includes a body 451 and protrusions 452. The intermediate member 45 for the present embodiment further includes a coupling portion 453.

The body 451 is between the first piston 42 and the first inner support 44 in the axial direction L. The body 451 for the present embodiment extends in the radial direction R.

The body 451 for the present embodiment is in contact with the first radial extension section 442 of the first inner support 44 from the axial-direction first side L1. The body 451 has a surface in contact with the first radial extension section 442 which surface has radial grooves 45a extending in the radial direction R. The radial grooves 45a extend across that contact surface continuously in the radial direction R. The radial grooves 45a, in other words, extend through the portion of the contact between the body 451 and the first radial extension section 442 from the radially inner side R1 to the radially outer side R2. The radial grooves 45a for the present embodiment are separated from one another in the circumferential direction C.

The protrusions 452 protrude toward the axial-direction first side L1 of the body 451. The protrusions 452 for the present embodiment protrude from the coupling portion 453 toward the axial-direction first side L1.

The coupling portion 453 is in the shape of a cylinder extending in the axial direction L. The coupling portion 453 is coupled to the first cylindrical support section 441 of the first inner support 44 in such a manner as to rotate integrally with the first cylindrical support section 441. The coupling portion 453 for the present embodiment is on the radially inner side R1 of the first cylindrical support section 441, adjacent to the first cylindrical support section 441, and coupled to the first cylindrical support section 441. Specifically, the first cylindrical support section 441 includes at an inner circumferential portion thereof a plurality of splines extending in the axial direction L and separated from one another in the circumferential direction C. The coupling portion 453 also includes similar splines at an outer circumferential portion thereof. The two sets of splines are engaged with each other, so that the coupling portion 453 is coupled to the first cylindrical support section 441 in such a manner as to rotate integrally with the first cylindrical support section 441.

The coupling portion 453 for the present embodiment includes on the axial-direction second side L2 an end portion coupled to that end portion of the body 451 which is on the radially outer side R2. The coupling portion 453 includes on the axial-direction first side L1 an end portion from which the protrusions 452 protrude toward the axial-direction first side L1. In the illustrated example, the body 451, the protrusions 452, and the coupling portion 453 are integral with one another.

The first piston 42 corresponds to the "press member". The first piston 42 is so positioned as to press the first inner friction members 411 and the first outer friction members 412 from the axial-direction first side L1. The first piston 42 for the present embodiment is configured to press the first friction members 41 with a pressure corresponding to the pressure of oil supplied into the first operating oil chamber 43. The first piston 42 for the present embodiment mainly includes an alloy containing iron.

The first piston 42 for the present embodiment includes a first slide section 421, a first press section 422, and a connection section 423.

The first slide section 421 extends in the radial direction R. The first slide section 421 for the present embodiment is a ring-shaped plate extending in the radial direction R and the circumferential direction C. The first slide section 421 is slidable in the axial direction L inside a first cylinder C1. The first slide section 421 for the present embodiment is on the radially inner side R1 of the first friction members 41, and coincides with the first friction members 41 as viewed in the radial direction R.

The first cylinder C1 extends in the axial direction L. The first cylinder C1 for the present embodiment is made up of the input member I and the intermediate member 45. Specifically, the first slide section 421 includes at an end portion thereof on the radially inner side R1 an inner slide section 421A in the shape of a cylinder. The inner slide section 421A has an inner circumferential surface that defines a gap together with the outer peripheral surface of the cylindrical input section Ia. The gap contains a first seal member S1. Further, the first slide section 421 includes at an end portion thereof on the radially outer side R2 an outer slide section 421B in the shape of a cylinder. The outer slide section 421B has an outer peripheral surface that defines a gap together with the inner circumferential surface of the coupling portion 453. The gap contains a second seal member S2. This allows the inner slide section 421A of the first piston 42 to slide in the axial direction L relative to the cylindrical input section Ia of the input member I, and also allows the outer slide section 421B of the first piston 42 to slide in the axial direction L relative to the coupling portion 453 of the intermediate member 45. The first piston 42 is thus slidable in the axial direction L relative to slide reference members T, which are rotatable integrally with the first inner support 44. The slide reference members T for the present embodiment are the input member I and the intermediate member 45.

As described above, the present embodiment is arranged such that the first piston 42 is slidable on the slide reference members T at respective portions each with a gap filled with a seal member (namely, the first seal member S1 and the second seal member S2). The first seal member S1 for the present embodiment is attached to a groove extending in the outer peripheral surface of the cylindrical input section Ia continuously in the circumferential direction C. The second seal member S2 is attached to the outer peripheral surface of the outer slide section 421B. The first seal member S1 and the second seal member S2 are each made of an elastic material such as nitrile rubber (NBR) or styrene-butadiene rubber (SBR).

The first press section 422 is on the axial-direction first side L1 of the first friction members 41, and is adjacent to the first friction members 41. The first press section 422 for the present embodiment is a ring-shaped plate extending in the radial direction R and the circumferential direction C.

The connection section 423 connects the first slide section 421 with the first press section 422. The connection section 423 for the present embodiment extends in the radial direction R in such a manner as to bypass the first cylindrical support section 441 of the first inner support 44 on the axial-direction first side L1. The connection section 423 thereby connects that end portion of the first slide section 421 which is on the radially outer side R2 with that end portion of the first press section 422 which is on the radially inner side R1. Specifically, the connection section 423 includes a first cylindrical connection section 423A, a second cylindrical connection section 423B, and an intermediate connection section 423C. The first cylindrical connection section 423A is connected with the outer slide section 421B, and protrudes from the outer slide section 421B toward the axial-direction first side L1. The second cylindrical connection section 423B is on the radially outer side R2 of the first cylindrical connection section 423A, is connected with that end portion of the first press section 422 which is on the radially inner side R1, and protrudes from that end portion toward the axial-direction first side L1. The intermediate connection section 423C is in the shape of a ring-shaped plate connecting the first cylindrical connection section 423A with the second cylindrical connection section 423B in the radial direction R.

The first piston 42 has insertion holes 424 extending through the first piston 42 in the axial direction L. The insertion holes 424 for the present embodiment extend through the connection section 423 in the axial direction L. Specifically, the insertion holes 424 are in the intermediate connection section 423C. The insertion holes 424 receive the respective protrusions 452 of the intermediate member 45 as inserted. The insertion holes 424, with the respective protrusions 452 inserted therein, serve to restrict rotation of the first piston 42 relative to the first inner support 44. This allows the first piston 42 to rotate integrally with the first inner support 44. The insertion holes 424 and the protrusions 452 will be detailed later.

The first piston 42 for the present embodiment is urged by first urging members 42a toward the axial-direction first side L1. The first urging members 42a are between the first slide section 421 and the body 451 of the intermediate member 45 in the axial direction L. The first urging members 42a for the present embodiment are separated from one another in the circumferential direction C. The first urging members 42a may be, for example, a return spring. With the above arrangement, when the first operating oil chamber 43 has received oil with a predetermined pressure from a hydraulic pressure control device (not illustrated in the drawings), the first piston 42 responds to the pressure to slide toward the axial-direction second side L2 against the urging force of the first urging members 42a and press the first friction members 41 toward the axial-direction second side L2.

The first operating oil chamber 43 is adjacent to the first piston 42 in the axial direction L. The first operating oil chamber 43 for the present embodiment is between the first piston 42 and the oil chamber forming member 46. Specifically, the first operating oil chamber 43 is between the first slide section 421 of the first piston 42 and the oil chamber forming member 46 in the axial direction L.

The first operating oil chamber 43 for the present embodiment coincides with the first friction members 41 as viewed in the radial direction R. The first operating oil chamber 43 for the present embodiment does not coincide with the first friction members 41 as viewed in the axial direction L.

The oil chamber forming member 46 for the present embodiment is in contact with the outer peripheral surface of the cylindrical input section Ia of the input member I. The oil chamber forming member 46 for the present embodiment is on the axial-direction first side L1 of the first piston 42. The oil chamber forming member 46 for the present embodiment is on the axial-direction first side L1 of the first slide section 421 of the first piston 42, and is adjacent to the first slide section 421.

The present embodiment includes a first cancel oil chamber 47 and a lubricating oil path 48 between the first piston 42 and the first inner support 44 in the axial direction L. The first cancel oil chamber 47 is a space for creating a hydraulic pressure for counteracting a centrifugal hydraulic pressure created in the first operating oil chamber 43. The first cancel oil chamber 47 for the present embodiment is between the first slide section 421 of the first piston 42 and the body 451 of the intermediate member 45 in the axial direction L. The lubricating oil path 48 serves to supply oil to an inner circumferential portion of the first inner support 44 (first cylindrical support section 441) from the radially inner side R1.

The body 451 of the intermediate member 45 for the present embodiment separates the first cancel oil chamber 47 and the lubricating oil path 48 from each other. The body 451, as described above, extends in the radial direction R. This means that the first cancel oil chamber 47 is on the axial-direction first side L1 of the body 451 and that the lubricating oil path 48 is on the axial-direction second side L2 of the body 451.

Figure 4:
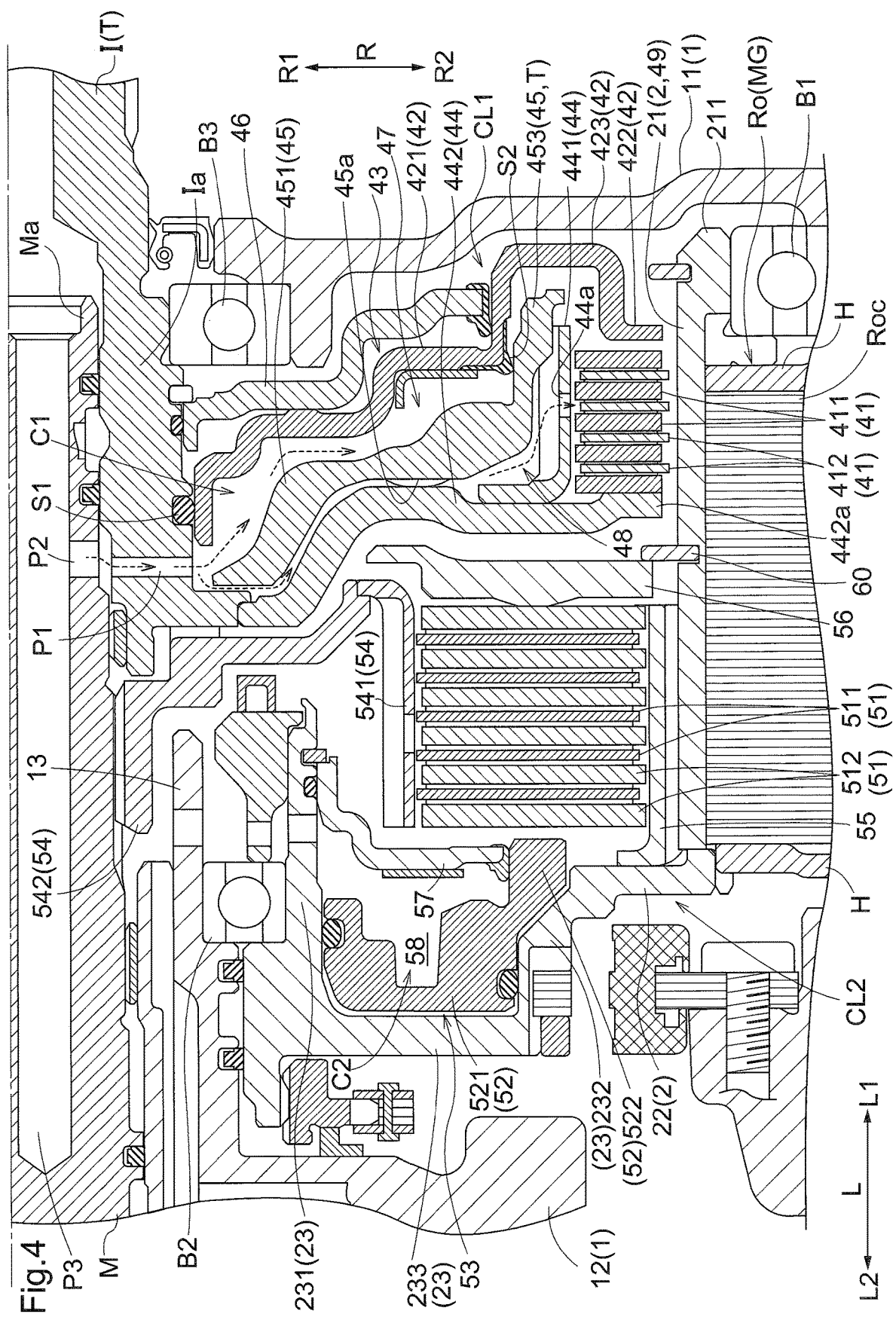
FIG. 4 is an enlarged partial cross-sectional view of a vehicle drive device as an embodiment.

As illustrated in FIG. 4, the first cancel oil chamber 47 and lubricating oil path 48 for the present embodiment receive oil through a first oil path P1, a second oil path P2, and a third oil path P3.

The first oil path P1 extends from the inner circumferential surface of the cylindrical input section Ia of the input member I to the outer peripheral surface thereof. The first oil path P1 for the present embodiment connects with the space between the first piston 42 and the first inner support 44. The second oil path P2 connects the first oil path P1 with the third oil path P3. The second oil path P2 is in the insert portion Ma of the input transmission shaft M. The second oil path P2 for the present embodiment extends through the insert portion Ma in the radial direction R from the third oil path P3 to the outer peripheral surface of the insert portion Ma. The third oil path P3 is in the input transmission shaft M. The third oil path P3 for the present embodiment extends in the axial direction L.

The present embodiment allows oil to flow sequentially through the third oil path P3, the second oil path P2, and the first oil path P1 into the space between the first piston 42 and the first inner support 44. The oil having flown into the space then flows toward the radially outer side R2 into both the first cancel oil chamber 47 and the lubricating oil path 48. The first cancel oil chamber 47 has a space that is closed except at a portion that communicates with the first oil path P1. After the first cancel oil chamber 47 has become filled with oil, the oil from the first oil path P1 flows mainly into the lubricating oil path 48. The oil having flown into the lubricating oil path 48 then flows through the radial grooves 45a to reach an inner circumferential portion of the first cylindrical support section 441. The oil having reached the inner circumferential portion of the first cylindrical support section 441 then flows through a communication hole 44a, which extends through the first cylindrical support section 441 in the radial direction R, to reach the first friction members 41. The oil thus lubricates and cools the first friction members 41.

As illustrated in FIG. 3, the second clutch device CL2 for the present embodiment includes (i) second inner friction members 511 and second outer friction members 512 arranged in the axial direction L, (ii) a second piston 52 configured to press the second inner friction members 511 and the second outer friction members 512 in the axial direction L, and (iii) a second operating oil chamber 53 configured to receive oil for operating the second piston 52.

The second inner friction members 511 and the second outer friction members 512 are each in the shape of a ring-shaped plate, and share the same rotation axis. Further, the second inner friction members 511 and the second outer friction members 512 are arranged alternately in the axial direction L. The second inner friction members 511 and the second outer friction members 512 may be such that one of the former and the latter serves as friction plates while the other serves as separate plates. The description below may use the term "second friction members 51" to collectively refer to the second inner friction members 511 and the second outer friction members 512.

The second inner friction members 511 are supported by a second inner support 54. The second inner support 54 supports the second inner friction members 511 from the radially inner side R1. The second inner support 54 for the present embodiment includes a second cylindrical support section 541 extending in the axial direction L and a second radial extension section 542 extending in the radial direction R on the radially inner side R1 of the second cylindrical support section 541.

The second cylindrical support section 541 supports the second inner friction members 511 from the radially inner side R1. The second cylindrical support section 541 in the illustrated example includes at an outer circumferential portion thereof a plurality of splines extending in the axial direction L over the entire area in the axial direction L and separated from one another in the circumferential direction C. The second inner friction members 511 also each include similar splines at an inner circumferential portion thereof. The two sets of splines are engaged with each other, so that the second inner friction members 511 are supported by the second cylindrical support section 541 from the radially inner side R1. The second inner friction members 511 are thus restricted in its rotation relative to the second cylindrical support section 541, and are supported by the second cylindrical support section 541 in such a manner as to be slidable in the axial direction L.

The second radial extension section 542 is coupled to the second cylindrical support section 541 in such a manner as to rotate integrally with the second cylindrical support section 541. The second radial extension section 542 for the present embodiment is a member separate from the second cylindrical support section 541, and is welded, swaged, or otherwise joined to the second cylindrical support section 541. The second radial extension section 542 and second cylindrical support section 541 in the illustrated example are welded to each other with the second radial extension section 542 having on the radially outer side R2 an end portion coupled to that end portion of the second cylindrical support section 541 which is on the axial-direction first side L1. The second radial extension section 542 for the present embodiment is a ring-shaped plate extending in the radial direction R and the circumferential direction C.

The second radial extension section 542 is coupled to the input transmission shaft M in such a manner as to rotate integrally with the input transmission shaft M. The second radial extension section 542 for the present embodiment includes on the radially inner side R1 an end portion coupled to the outer peripheral surface of the input transmission shaft M. The second radial extension section 542 in the illustrated example includes at an end portion thereof on the radially inner side R1 a cylindrical portion having an inner circumferential surface provided with a plurality of splines extending in the axial direction L and separated from one another in the circumferential direction C. The input transmission shaft M also includes similar splines on an outer circumferential surface thereof. The two sets of splines are engaged with each other, so that the second radial extension section 542 is coupled to the input transmission shaft M in such a manner as to rotate integrally with the input transmission shaft M.

The second outer friction members 512 are supported by a second outer support 55. The second outer support 55 supports the second outer friction members 512 from the radially outer side R2. The second outer support 55 for the present embodiment is in the shape of a cylinder extending in the axial direction L. The second outer support 55 in the illustrated example includes at an inner circumferential portion thereof a plurality of splines extending in the axial direction L and separated from one another in the circumferential direction C. The second outer friction members 512 also each include similar splines at an outer circumferential portion thereof. The two sets of splines are engaged with each other, so that the second outer friction members 512 are supported by the second outer support 55 from the radially outer side R2. The second outer friction members 512 are thus restricted in its rotation relative to the second outer support 55, and are supported by the second outer support 55 in such a manner as to be slidable in the axial direction L.

The second outer support 55 is rotatable integrally with the rotor support 2. The second outer support 55 for the present embodiment is supported by the cylindrical portion 21 of the rotor support 2 from the radially outer side R2. The second outer support 55 in the illustrated example includes at an outer circumferential portion thereof a plurality of splines extending in the axial direction L and separated from one another in the circumferential direction C. The cylindrical portion 21, as described above, also includes at an inner circumferential portion thereof a plurality of splines extending in the axial direction L and separated from one another in the circumferential direction C. The two sets of splines are engaged with each other, so that the second outer support 55 is supported by the cylindrical portion 21 from the radially outer side R2. The second outer friction members 512 are thus supported by the cylindrical portion 21 of the rotor support 2 with the second outer support 55 therebetween.

The second clutch device CL2 for the present embodiment includes a contact member 56 in contact with a second friction member 51. The contact member 56 is in contact with a second friction member 51 from that side in the axial direction L which is opposite to the second piston 52 (for the present embodiment, from the axial-direction first side L1). The contact member 56 for the present embodiment is in contact, from the axial-direction first side L1, with a second outer friction member 512 furthermost on the axial-direction first side L1.

The contact member 56 for the present embodiment is supported by the cylindrical portion 21 from the radially outer side R2. The contact member 56 in the illustrated example includes at an outer circumferential portion thereof a plurality of splines extending in the axial direction L and separated from one another in the circumferential direction C. These splines are engaged with the splines at the inner circumferential portion of the cylindrical portion 21, so that the contact member 56 is restricted in its rotation relative to the cylindrical portion 21 and supported by the cylindrical portion 21 from the radially outer side R2 in such a manner as to be slidable in the axial direction L. Further, the illustrated example includes a ring-shaped fixing member 60 that is in contact with the contact member 56 from the axial-direction first side L1 and that is fixed to the inner circumferential portion of the cylindrical portion 21. The fixing member 60 thus restricts movement of the contact member 56 toward the axial-direction first side L1. The fixing member 60 for the present embodiment is a snap ring.

The second piston 52 for the present embodiment is configured to press the second friction members 51 in the axial direction L with a pressure corresponding to the pressure of oil supplied into the second operating oil chamber 53. The second piston 52 for the present embodiment is on the axial-direction second side L2 of the second friction members 51. The second piston 52, in other words, does not coincide with the second friction members 51 as viewed in the radial direction R. The second piston 52 includes a second slide section 521 and a second press section 522.

The second slide section 521 is slidable in the axial direction L inside a second cylinder C2. The second cylinder C2 extends in the axial direction L. The second cylinder C2 for the present embodiment is made up of a cylinder forming portion 23 of the flange portion 22. The present embodiment is, in other words, arranged such that the flange portion 22 includes a portion that is also a portion of the second clutch device CL2.

The cylinder forming portion 23 protrudes toward the axial-direction second side L2 in such a manner as to form a second cylinder C2 in which the second piston 52 is slidable. The cylinder forming portion 23 for the present embodiment includes an inner cylindrical portion 231, an outer cylindrical portion 232, and a radial coupling portion 233.

The inner cylindrical portion 231 extends in the axial direction L. The inner cylindrical portion 231 has an outer circumferential surface having a portion that serves as a slide surface for that end portion of the second slide section 521 which is on the radially inner side R1 to slide on. The inner cylindrical portion 231 for the present embodiment covers the cylindrical protrusion 13 of the case 1 from the radially outer side R2.

The outer cylindrical portion 232 extends in the axial direction L, and is on the radially outer side R2 of the inner cylindrical portion 231. The outer cylindrical portion 232 has an inner circumferential surface having a portion that serves as a slide surface for that end portion of the second slide section 521 which is on the radially outer side R2 to slide on.

The radial coupling portion 233 extends in the radial direction R in such a manner as to couple the inner cylindrical portion 231 to the outer cylindrical portion 232. The radial coupling portion 233 for the present embodiment is a ring-shaped plate extending in the radial direction R and the circumferential direction C. The radial coupling portion 233 for the present embodiment includes on the radially inner side R1 an end portion coupled to that end portion of the inner cylindrical portion 231 which is on the axial-direction second side L2, and also includes on the radially outer side R2 an end portion coupled to that end portion of the outer cylindrical portion 232 which is on the axial-direction second side L2. The flange portion 22 includes on the radially outer side R2 of the cylinder forming portion 23 a ring-shaped plate extending in the radial direction R and the circumferential direction C and coupled to that end portion of the outer cylindrical portion 232 which is on the axial-direction first side L1. The flange portion 22 in the illustrated example is a single member made up integrally of the inner cylindrical portion 231, the outer cylindrical portion 232, and the radial coupling portion 233.

The second press section 522 extends from the second slide section 521 toward the radially outer side R2. The second press section 522 for the present embodiment is on that side of the second friction members 51 in the axial direction L which is opposite to the contact member 56 (for the present embodiment, on the axial-direction second side L2).

The second piston 52 is supported by the rotor support 2 in such a manner as to rotate integrally with the rotor support 2. The present embodiment is arranged such that the flange portion 22 of the rotor support 2 restricts rotation of the second piston 52 relative to the flange portion 22 so that the flange portion 22 is rotatable integrally with the second piston 52.

The second piston 52 for the present embodiment is urged by second urging members 52a, which are attached to an attachment member 57, toward the axial-direction second side L2. The second urging members 52a are between the second slide section 521 and the attachment member 57 in the axial direction L. The second urging members 52a for the present embodiment are separated from one another in the circumferential direction C. The second urging members 52a may be, for example, a return spring. With the above arrangement, when the second operating oil chamber 53 has received oil with a predetermined pressure from a hydraulic pressure control device (not illustrated in the drawings), the second piston 52 responds to the pressure to slide toward the axial-direction first side L1 against the urging force of the second urging members 52a and press the second friction members 51 toward the axial-direction first side L1.

The attachment member 57 is on the radially outer side R2 of the inner cylindrical portion 231 of the cylinder forming portion 23. The attachment member 57 for the present embodiment is in contact with the outer circumferential surface of the inner cylindrical portion 231. The attachment member 57 for the present embodiment is on the axial-direction first side L1 of the second slide section 521 of the second piston 52, and is adjacent to the second slide section 521.

The second operating oil chamber 53 is adjacent to the second piston 52 in the axial direction L. The second operating oil chamber 53 for the present embodiment is between the second piston 52 and the cylinder forming portion 23. Specifically, the second operating oil chamber 53 is between the second slide section 521 of the second piston 52 and the radial coupling portion 233 of the cylinder forming portion 23 in the axial direction L.

The second operating oil chamber 53 for the present embodiment coincides with the second friction members 51 as viewed in the axial direction L. The second operating oil chamber 53 for the present embodiment does not coincide with the second friction members 51 as viewed in the radial direction R.

The present embodiment includes a second cancel oil chamber 58 on that side of the second piston 52 in the axial direction L which is opposite to the second operating oil chamber 53 (for the present embodiment, on the axial-direction first side L1). The second cancel oil chamber 58 is a space for creating a hydraulic pressure for counteracting a centrifugal hydraulic pressure created in the second operating oil chamber 53. The second cancel oil chamber 58 for the present embodiment is between the second slide section 521 and the attachment member 57 in the axial direction L.

As illustrated in FIG. 3, the vehicle drive transmission device 100 for the present embodiment includes a first bearing B1 and a second bearing B2 both supporting the rotor support 2 in such a manner that the rotor support 2 is rotatable as well as a third bearing B3 supporting the input member I in such a manner that the input member I is rotatable. The first bearing B1, second bearing B2, and third bearing B3 for the present embodiment are each a ball bearing.

The first bearing B1 supports the cylindrical portion 21 of the rotor support 2 in such a manner that the cylindrical portion 21 is rotatable. The first bearing B1 for the present embodiment is on the radially outer side R2 of the first cylindrical support section 441 of the first inner support 44. The first bearing B1 for the present embodiment is on the axial-direction first side L1 of the rotor Ro. The first bearing B1 for the present embodiment is on the outer circumferential surface of the cylindrical portion 21. Specifically, the first bearing B1 is attached to the cylindrical portion 21 in such a manner as to have an inner circumferential surface in contact with the outer circumferential surface of a bearing support section 211 of the cylindrical portion 21, which protrudes on the axial-direction first side L1 of the rotor Ro. The first bearing B1 for the present embodiment is supported by a bearing support section 11a (see FIG. 2) of the first side wall 11 of the case 1. The bearing support section 11a protrudes toward the axial-direction second side L2, and supports the first bearing B1 from the radially outer side R2. The first bearing B1, as described above, supports the cylindrical portion 21 in such a manner that the cylindrical portion 21 is rotatable relative to the first side wall 11.

The first bearing B1 for the present embodiment coincides with the first piston 42 as viewed in the radial direction R. Specifically, the first bearing B1 coincides with the first press section 422 of the first piston 42 as viewed in the radial direction. The first bearing B1 for the present embodiment does not coincide with the rotor Ro as viewed in the axial direction L. The first bearing B1 for the present embodiment coincides with a coil end portion Ce of the stator St as viewed in the radial direction R (see FIG. 2).

The cylindrical portion 21 for the present embodiment includes a projection 21a protruding from the outer circumferential surface of the cylindrical portion 21 toward the radially outer side R2 and present on the axial-direction first side L1 of the rotor Ro. The projection 21a extends continuously over the entire area in the circumferential direction C. The projection 21a is sandwiched between the rotor Ro and the first bearing B1 in the axial direction L. Specifically, the rotor Ro is in contact with the projection 21a from the axial-direction second side L2, whereas the first bearing B1 is in contact with the projection 21a from the axial-direction first side L1.

The second bearing B2 supports the flange portion 22 of the rotor support 2 in such a manner that the flange portion 22 is rotatable. The second bearing B2 for the present embodiment coincides with the second piston 52 as viewed in the radial direction R. The second bearing B2 for the present embodiment is on the radially inner side R1 of the cylinder forming portion 23 of the flange portion 22, and coincides with the cylinder forming portion 23 as viewed in the radial direction R. The second bearing B2 supports the rotor support 2 from the radially inner side R1. The second bearing B2 in the illustrated example is between the inner cylindrical portion 231 of the rotor support 2 and the cylindrical protrusion 13 of the case 1.

The third bearing B3 for the present embodiment is on the radially inner side R1 of at least a portion of the first piston 42, and coincides with the first piston 42 as viewed in the radial direction R. The third bearing B3 for the present embodiment is on the radially inner side R1 of the first press section 422 of the first piston 42. The third bearing B3 coincides with the first press section 422 as viewed in the radial direction. The third bearing B3 for the present embodiment is on the axial-direction first side L1 of the oil chamber forming member 46. The third bearing B3 is on the radially inner side R1 of a portion of the oil chamber forming member 46.

The third bearing B3 for the present embodiment is on the outer circumferential surface of the cylindrical input section Ia of the input member I. Specifically, the third bearing B3 is attached to the cylindrical input section Ia in such a manner as to have an inner circumferential surface in contact with the outer circumferential surface of the cylindrical input section Ia. The third bearing B3 is supported by the first side wall 11 of the case 1 from the radially outer side R2. The third bearing B3, as described above, supports the input member I in such a manner that the input member I is rotatable relative to the first side wall 11.

The third bearing B3 for the present embodiment includes an inner race in contact with a step portion on the outer circumferential surface of the cylindrical input section Ia from the axial-direction first side L1, and also includes an outer race in contact with the first side wall 11 from the axial-direction second side L2. The third bearing B3 is thus restricted in its movement in the axial direction L by the cylindrical input section Ia and the first side wall 11. This allows the third bearing B3 to support a thrust load on the input member I which the third bearing B3 supports.

The description below deals with the protrusions 452 of the intermediate member 45 and the insertion holes 424 in the first piston 42 in detail.

Figure 5:
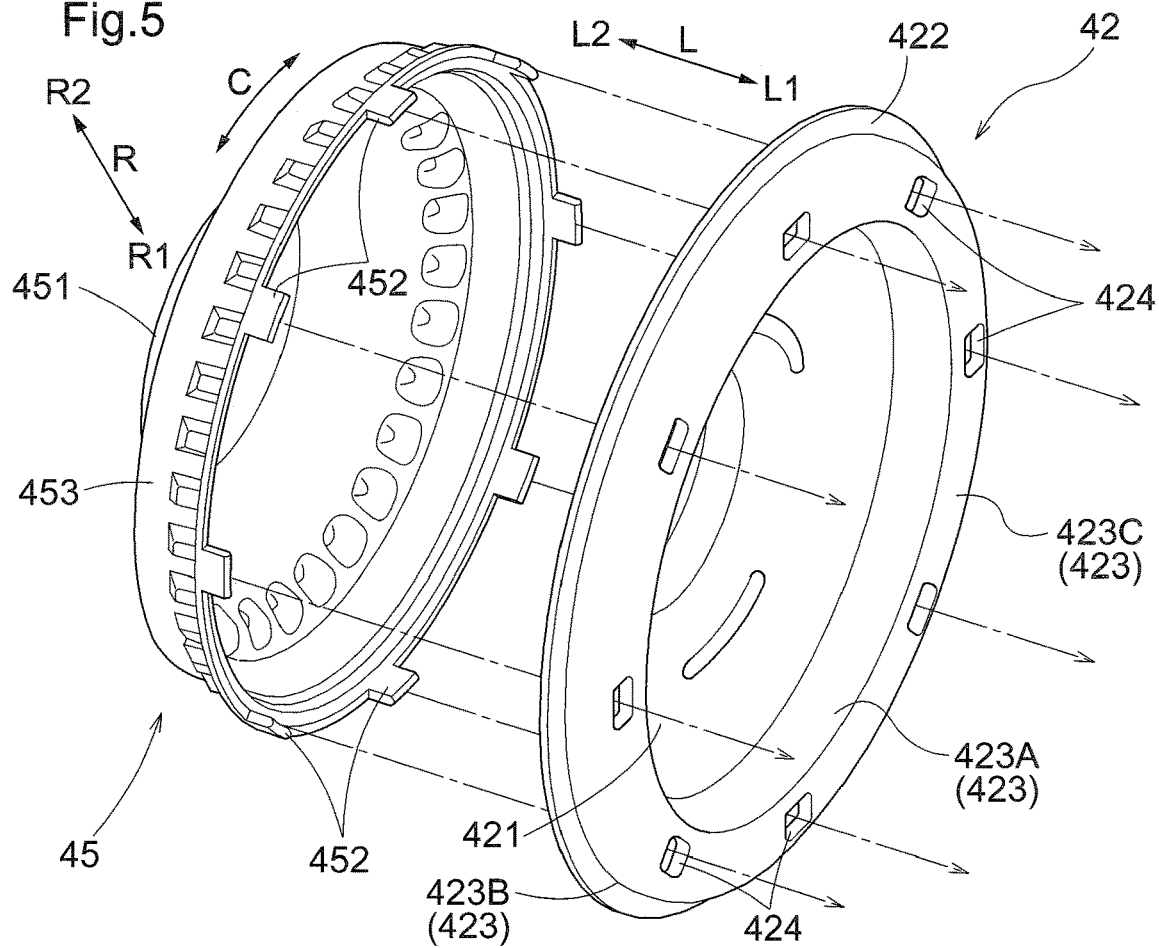
FIG. 5 is a perspective view of a press member and intermediate portion for an embodiment.

As illustrated in FIG. 5, the protrusions 452 for the present embodiment are each in the shape of a plate extending in the axial direction L and the circumferential direction C. The protrusions 452 share an equal dimension in the radial direction R (thickness) over the entire area in the axial direction L and the circumferential direction C. The insertion holes 424 are shaped to match the outer shape of the respective protrusions 452. The insertion holes 424 for the present embodiment, similarly to the protrusions 452, share an equal dimension in the radial direction R over the entire area in the axial direction L and the circumferential direction C.

The protrusions 452 for the present embodiment are separated from one another in the circumferential direction C. The illustrated example includes eight protrusions 452 disposed at regular intervals in the circumferential direction C. The insertion holes 424 for the present embodiment are separated from one another in the circumferential direction C. The insertion holes 424 are present in a number equal to the number of the protrusions 452. The illustrated example includes eight insertion holes 424 disposed at regular intervals in the circumferential direction C.

Figure 6:
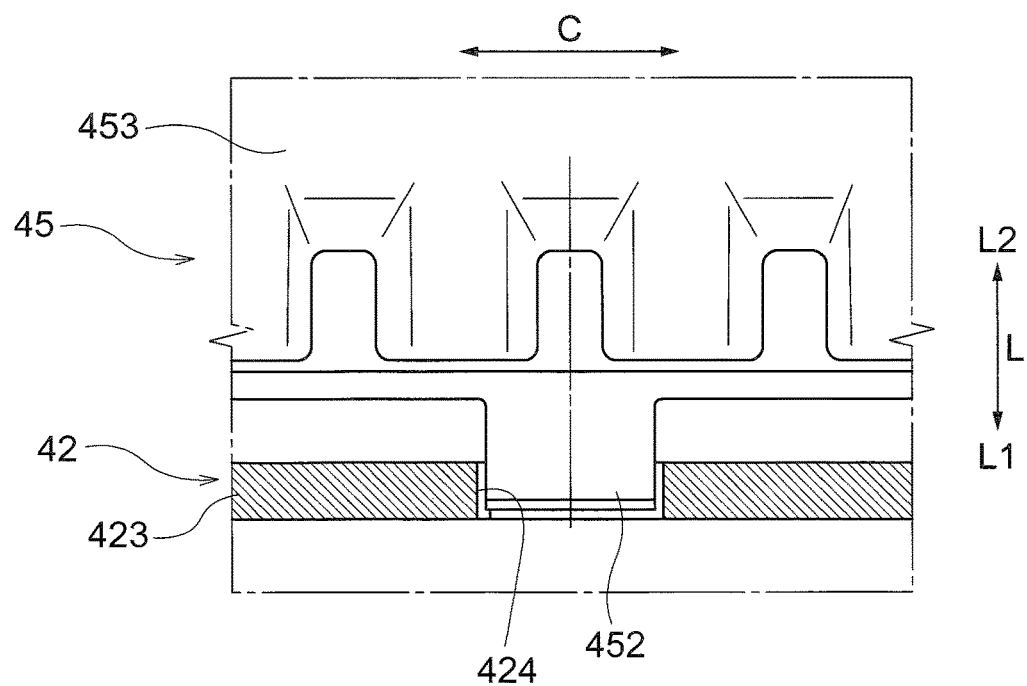
FIG. 6 is a cross-sectional view of a protrusion of an intermediate portion as inserted in an insertion hole in a press member.

As illustrated in FIG. 6, inserting the protrusions 452 into the respective insertion holes 424 results in the first piston 42 being restricted in its rotation relative to the intermediate member 45. Specifically, with the protrusions 452 in the respective insertion holes 424, trying to rotate the first piston 42 in the circumferential direction relative to the intermediate member 45 causes each protrusion 452 to come into contact in the circumferential direction C with an inner side face of the connection section 423 that faces the corresponding insertion hole 424. For instance, trying to rotate the first piston 42 toward a first side in the circumferential direction C relative to the intermediate member 45 causes that face of each protrusion 452 which faces the side opposite to the first side in the circumferential direction (that is, a second side in the circumferential direction) to come into contact with that face of the corresponding insertion hole 424 which faces the first side in the circumferential direction. Trying to rotate the first piston 42 toward the second side in the circumferential direction relative to the intermediate member 45 causes that face of each protrusion 452 which faces the first side in the circumferential direction to come into contact with that face of the corresponding insertion hole 424 which faces the second side in the circumferential direction. The first piston 42 is, as described above, restricted in its rotation relative to the intermediate member 45. The insertion holes 424 for the present embodiment each have a dimension in the circumferential direction C that is larger than the dimension of each protrusion 452 in the circumferential direction C by an amount not smaller than tolerances on (i) the respective dimensions of the protrusions 452 and the insertion holes 424 in the circumferential direction C and (ii) the intervals at which the protrusions 452 and the insertion holes 424 are disposed.

Figure 7:
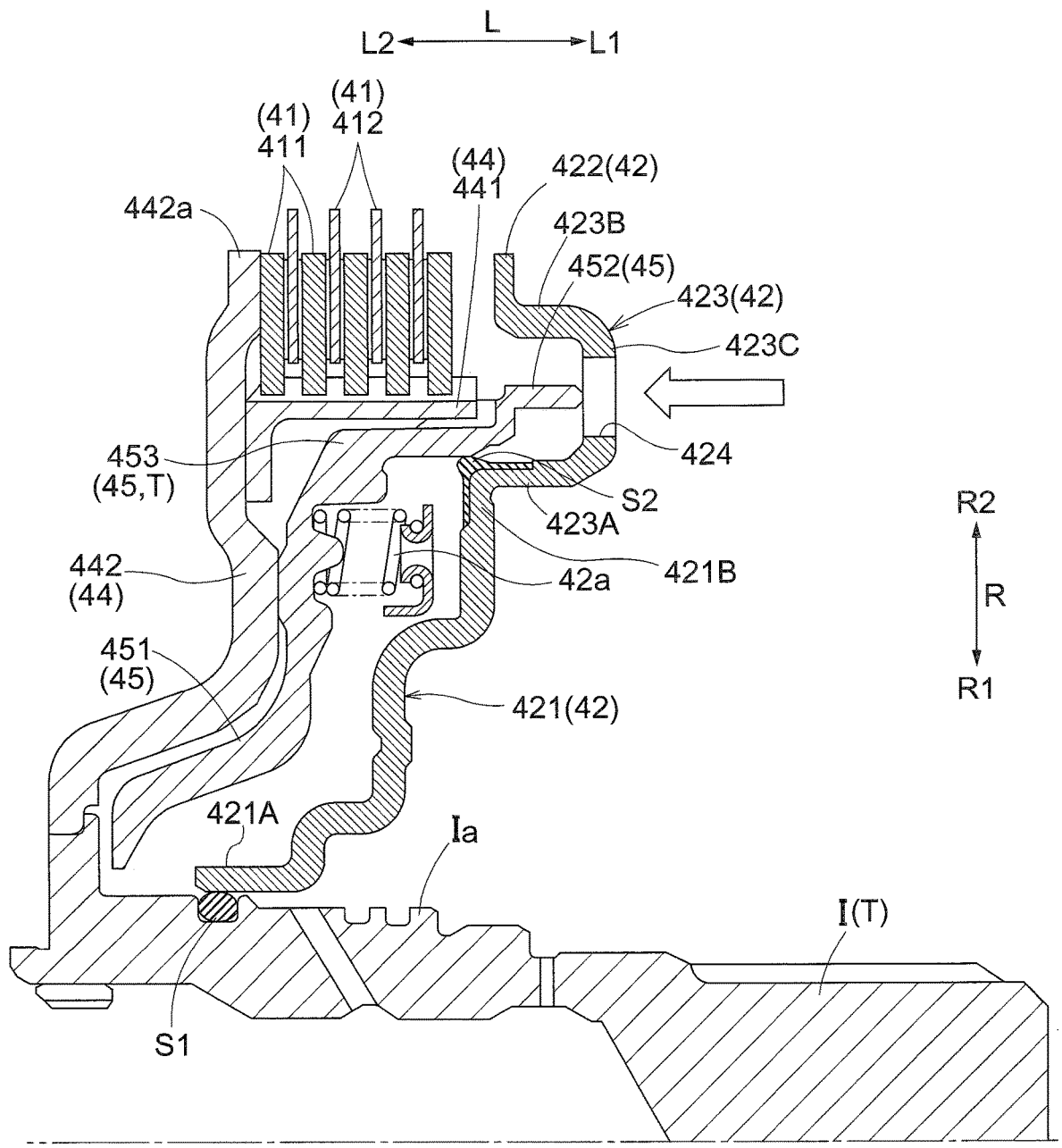
FIG. 7 is a view of a press member being assembled to an intermediate portion.

As illustrated in FIG. 7, when the first piston 42 is assembled to the intermediate member 45 from the axial-direction first side L1, the position of the first piston 42 in the circumferential direction C relative to the intermediate member 45, that is, its rotation phase, is adjusted such that all the protrusions 452 coincide with the respective insertion holes 424 as viewed from the axial-direction first side L1. Moving the first piston 42 in the above state toward the intermediate member 45, that is, toward the axial-direction second side L2, causes the protrusions 452 to enter the respective insertion holes 424. Then, moving the first piston 42 further toward the intermediate member 45 such that the protrusions 452 are inserted into the respective insertion holes 424 allows the first piston 42 to be assembled to the intermediate member 45. The assembly of the first piston 42 is facilitated as described above through simple adjustment of the position of the first piston 42 relative to the intermediate member 45 so that all the protrusions 452 coincide with the respective insertion holes 424 as viewed from the axial-direction first side L1.

The present embodiment, as described above, includes a first seal member S1 in a gap between that end portion of the first slide section 421 which is on the radially inner side R1 and the cylindrical input section Ia, and also includes a second seal member S2 in a gap between that end portion of the first slide section 421 which is on the radially outer side R2 and the coupling portion 453. Facilitating the assembly of the first piston 42 for the above configuration reduces unnecessary movements and rotations of the first piston 42 relative to the intermediate member 45 during the assembly. This in turn reduces the risk of the first seal member S1 and the second seal member S2 being damaged by, for example, friction during assembly. It is preferable to design the respective positions of the insertion holes 424 in the axial direction L and the respective positions and dimensions of the protrusions 452 in the axial direction L such that the first seal member S1 comes into contact with that end portion of the first slide section 421 which is on the radially inner side R1, whereas the second seal member S2 comes into contact with the inner circumferential portion of the coupling portion 453, immediately before the protrusions 452 start to enter the respective insertion holes 424 for insertion or as soon as the protrusions 452 start to enter the respective insertion holes 424 for insertion.

Figure 8:
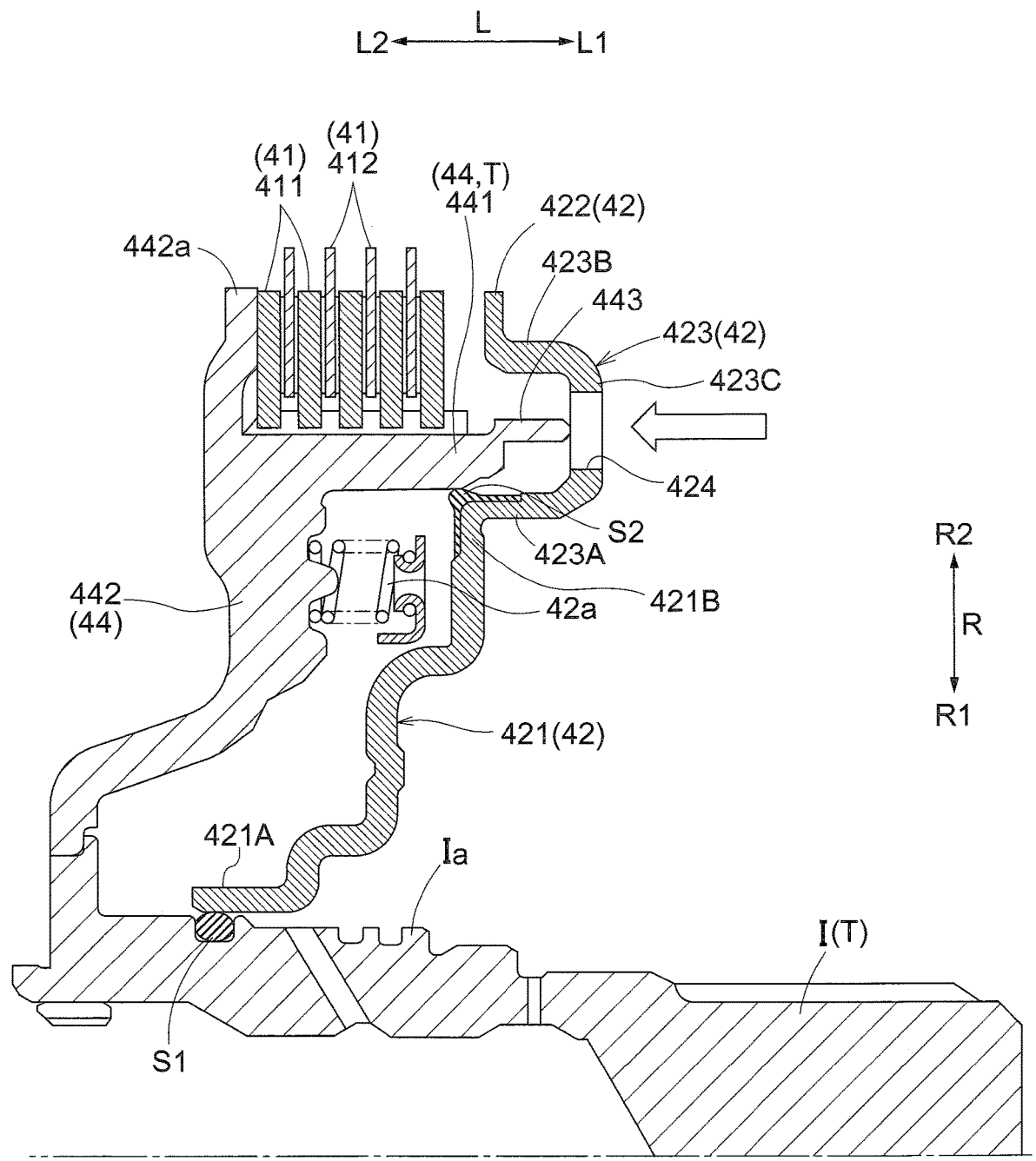
FIG. 8 is a cross-sectional view of slide reference members and press member for an alternative embodiment.

Alternative Embodiments (1) The embodiment described above is an example including an intermediate member 45 including protrusions 452 for insertion into the respective insertion holes 424. The present invention is, however, not limited to such a configuration, and may alternatively be configured, for instance, such that the first inner support 44 includes protrusions 443 for insertion into the respective insertion holes 424 as illustrated in FIG. 8. With the present invention configured as such, the protrusions 443 preferably protrude from the first cylindrical support section 441 of the first inner support 44 toward the axial-direction first side L1. Further, with the present invention configured as above, the vehicle drive transmission device 100 may omit the intermediate member 45.

(2) The embodiment described above is an example involving the input member I and the intermediate member 45 as slide reference members T. The present invention is, however, not limited to such a configuration, and may alternatively be configured, for instance, such that with the intermediate member 45 absent as illustrated in FIG. 8, the first inner support 44 serves instead as a slide reference member T. In this case, the second seal member S2 is preferably in a gap between the first cylindrical support section 441 of the first inner support 44 and that end portion of the first slide section 421 which is on the radially outer side R2. Specifically, the second seal member S2 is preferably in a gap between the outer circumferential surface of the outer slide section 421B of the first slide section 421 and the inner circumferential surface of the first cylindrical support section 441.

(3) The embodiment described above is an example in which the body 451 of the intermediate member 45 separates the first cancel oil chamber 47 and the lubricating oil path 48 from each other. The present invention is, however, not limited to such a configuration, and may alternatively be configured, for instance, such that the cylindrical input section Ia of the input member I has an outer circumferential surface provided with a member protruding toward the radially outer side R2 and that that member separates the first cancel oil chamber 47 and the lubricating oil path 48 from each other. With the present invention configured as such, for instance, the first oil path P1 and the second oil path P2 are preferably replaced with an oil path communicating the third oil path P3 with the first cancel oil chamber 47 and another oil path communicating the third oil path P3 with the lubricating oil path 48.

(4) The embodiment described above is an example in which the first outer support 49 is integral with the cylindrical portion 21. The present invention is, however, not limited to such a configuration, and may alternatively be configured such that the first outer support 49 is, similarly to the second outer support 55, a member separate from the cylindrical portion 21.

(5) The embodiment described above is an example in which the second clutch device CL2 is on the axial-direction second side L2 of the first clutch device CL1, and is adjacent to the first clutch device CL1. The present invention is, however, not limited to such a configuration, and may alternatively be configured, for instance, such that the second clutch device CL2 is apart from the first clutch device CL1 in the radial direction R or that the second clutch device CL2 is absent.

(6) The arrangements disclosed for the above embodiments may each be combined with an arrangement disclosed for another embodiment, as long as such a combination does not cause a contradiction. Further, the embodiments disclosed in the present specification are mere examples in all aspects. The present invention may thus be variously altered as appropriate, as long as such an alteration falls within the scope of the present disclosure.

Outline of the Embodiment Described Above

The description below outlines the vehicle drive transmission device (100) and vehicle drive device (10) described above.

A vehicle drive transmission device (100) includes:
a first friction plate (412) and a second friction plate (411) arranged in an axial direction (L); a friction clutch device (CL1) including a press member (42) configured to press the first friction plate (412) and the second friction plate (411) in the axial direction (L);
a first support (49) supporting the first friction plate (412) from an outer side (R2) in a radial direction (R);
a second support (44) supporting the first friction plate (411) from an inner side (R1) in the radial direction (R); and
an intermediate member (45) coupled to the second support (44) in such a manner as to rotate integrally with the second support (44), wherein
the first support (49) is open toward a first side (L1) in the axial direction (L),
the press member (42) is at such a position as to press the first friction plate (412) and the second friction plate (411) from the first side (L1) in the axial direction,
the intermediate member (45) includes: a body (451) between the press member (42) and the second support (44) in the axial direction (L); and a protrusion (452) protruding toward the first side (L1) of the body (451) in the axial direction; and
the press member (42) has an insertion hole (424) extending in the axial direction (L) and configured to receive the protrusion (452).

The above vehicle drive transmission device is configured such that the intermediate member (45) includes a body (451) and a protrusion (452) protruding toward the first side (L1) of the body (451) in the axial direction and that the press member (42) has an insertion hole (424) extending through the press member (42) in the axial direction (L) and configured to receive the protrusion (452). With the protrusion (452) in the insertion hole (424), the press member (42) is restricted in its rotation relative to the second support (44). The use of the protrusion (452) and the insertion hole (424) appropriately restricts rotation of the press member (42) and the second support (44) relative to each other. Further, when the press member (42) is assembled to the intermediate member (45) from the first side (L1) in the axial direction, the assembler is able to see, from the first side (L1) in the axial direction through the insertion hole (424) in the press member (42), the protrusion (452) to be inserted into the insertion hole (424). The above configuration thereby allows the assembler to easily adjust the rotation phase of the press member (42) and insert the protrusion (452) into the insertion hole (424), facilitating the assembly of the press member (42).

The vehicle drive transmission device (100) may preferably further include: a cancel oil chamber (47) and a lubricating oil path (48) between the press member (42) and the second support (44) in the axial direction (L), the cancel oil chamber (47) being configured to create a hydraulic pressure for counteracting a centrifugal hydraulic pressure created in an operating oil chamber (43) configured to receive oil for operating the press member (42), the lubricating oil path (48) being configured to supply oil to an inner circumferential portion of the second support (44) from the inner side (R1) in the radial direction (R), wherein the body (451) separates the cancel oil chamber (47) and the lubricating oil path (48) from each other.

With the above configuration, the body (451) of the intermediate member (45) separates the cancel oil chamber (47) and the lubricating oil path (48) from each other. This allows the vehicle drive transmission device (100) to be downsized easily as compared to a configuration including an additional member for separating the cancel oil chamber (47) and the lubricating oil path (48) from each other.

A vehicle drive transmission device (100) includes:
a first friction plate (412) and a second friction plate (411) arranged in an axial direction (L); a friction clutch device (CL1) including a press member (42) configured to press the first friction plate (412) and the second friction plate (411) in the axial direction (L);
a first support (49) supporting the first friction plate (412) from an outer side (R2) in a radial direction (R);
a second support (44) supporting the first friction plate (411) from an inner side (R1) in the radial direction (R), wherein
the first support (49) is open toward a first side (L1) in the axial direction (L),
the second support (44) includes: a cylindrical support section (441) extending in the axial direction (L) and supporting the second friction plate (411); and a radial extension section (442) extending in the radial direction (R) on an inner side (R1) of the cylindrical support section (441) in the radial direction (R) and coupled to the cylindrical support section (441),
the press member (42) is at such a position as to press the first friction plate (412) and the second friction plate (411) from the first side (L1) in the axial direction,
the second support (44) further includes a protrusion (452) protruding from the cylindrical support section (441) toward the first side (L1) in the axial direction, and
the press member (42) has an insertion hole (424) extending in the axial direction (L) and configured to receive the protrusion (452).

The above vehicle drive transmission device is configured such that the second support (44) includes a cylindrical support section (441) and a protrusion (452) protruding from the cylindrical support section (441) toward the first side (L1) in the axial direction and that the press member (42) has an insertion hole (424) extending through the press member (42) in the axial direction (L) and configured to receive the protrusion (452). With the protrusion (452) in the insertion hole (424), the press member (42) is restricted in its rotation relative to the second support (44). The use of the protrusion (452) and the insertion hole (424) appropriately prevents rotation of the press member (42) and the second support (44) relative to each other. Further, when the press member (42) is assembled to the second support (44) from the first side (L1) in the axial direction, the assembler is able to see, from the first side (L1) in the axial direction through the insertion hole (424) in the press member (42), the protrusion (452) to be inserted into the insertion hole (424). The above configuration thereby allows the assembler to easily adjust the rotation phase of the press member (42) and insert the protrusion (452) into the insertion hole (424), facilitating the assembly of the press member (42).

The vehicle drive transmission device (100) may preferably be further arranged such that the press member (42) is slidable in the axial direction (L) on the second support (44) or a slide reference member (T) configured to rotate integrally with the second support (44), and the press member (42) is slidable on the slide reference member (T) at a portion with a gap filled with a seal member (S1, S2).

Facilitating the assembly of the press member (42) to the intermediate member (45) or the second support (44) reduces unnecessary movements and rotations of the press member (42) relative to the slide reference member (T) during the assembly, and thereby reduces the risk of the seal member (S1, S2) being damaged by, for example, friction during the assembly.

A vehicle drive device (10) includes:
a rotary electric machine (MG) including a stator (St) and a rotor (Ro) on the inner side (R1) of the stator (St) in the radial direction (R) to serve as a driving source for a wheel (W); and
the vehicle drive transmission device (100), wherein
the vehicle drive transmission device (100) further includes a rotor support (2) supporting the rotor (Ro),
the rotor support (2) includes: a cylindrical portion (21) extending in the axial direction (L) and supporting the rotor (Ro) from the inner side (R1) in the radial direction (R); and a flange portion (22) extending in the radial direction (R) on the inner side (R1) of the cylindrical portion (21) in the radial direction (R) and coupled to the cylindrical portion (21),
the cylindrical portion (21) is on the outer side (R2) of the friction clutch device (CL1) in the radial direction (R), and
the flange portion (22) is on a second side (L2) of the friction clutch device (CL1) in the axial direction, the second side (L2) being opposite to the first side (L1) in the axial direction.

Suppose a friction clutch device that is positioned on the inner side (R1) of a cylindrical portion (21) of a rotor support (2) in the radial direction (R) and on the first side (L1) of a flange portion (22) in the axial direction as with the above configuration. In such a case, an assembler would normally assemble a press member (42) to, for example, a second support (44) on the inner side (R1) of the cylindrical portion (21) in the radial direction (R). The assembler would then be unable to easily see the components during the assembly. The above configuration, in contrast, ensures that the assembler is able to easily see the components during the assembly as described above, facilitating the assembly of the press member (42) in the above case as well.

INDUSTRIAL APPLICABILITY

The techniques described in the present disclosure are applicable to (i) a vehicle drive transmission device including first friction plates and second friction plates arranged in an axial direction and a friction clutch device including a press member configured to press the first friction plates and the second friction plates in the axial direction and (ii) a vehicle drive device including the vehicle drive transmission device.

REFERENCE SIGNS LIST

10 Vehicle drive device
100 Vehicle drive transmission device
2 Rotor support
21 Cylindrical portion
22 Flange portion
CL1 First clutch device (friction clutch device)
411 First inner friction member (second friction plate)
412 First outer friction member (first friction plate)
42 First piston (press member)
424 Insertion hole
44 First inner support (second support)
441 First cylindrical support section (cylindrical support section)
442 First radial extension section (radial extension section)
45 Intermediate member
451 Body
452 Protrusion
49 First outer support (first support)
T Slide reference member
MG Rotary electric machine
St Stator
Ro Rotor
W Wheel
L Axial direction
L1 Axial-direction first side
L2 Axial-direction second side
R Radial direction
R1 Radially inner side
R2 Radially outer side

The invention claimed is:

1. A vehicle drive transmission device, comprising:
a first friction plate and a second friction plate arranged in an axial direction;
a friction clutch device including a press member configured to press the first friction plate and the second friction plate in the axial direction;
a first support supporting the first friction plate from an outer side in a radial direction;
a second support supporting the second friction plate from an inner side of the second support in the radial direction; and
an intermediate member coupled to the second support in such a manner as to rotate integrally with the second support, wherein
the first support is open toward a first side in the axial direction,
the press member is at such a position as to press the first friction plate and the second friction plate from the first side in the axial direction,
the intermediate member includes:
a body between the press member and the second support in the axial direction; and
a protrusion protruding toward the first side of the body in the axial direction;
the press member has an insertion hole extending through the press member in the axial direction and configured to receive the protrusion,
the second support includes a cylindrical support section which is formed in a cylinder extending in the axial direction and which supports the second friction plate,
the intermediate member further includes a coupling portion which is formed in a cylinder extending in the axial direction and which is coupled to the cylindrical support section at the cylindrical support section while the intermediate member is adjacent to the cylindrical support section from the inner side,
the protrusion protrudes from the coupling portion toward the first side in the axial direction,
the cylindrical support section includes a first spline extending in the axial direction, the first spline disposed at an inner circumferential portion of the cylindrical support section, and
the coupling portion includes a second spline extending in the axial direction, the second spline disposed at an outer circumferential portion of the coupling portion to engage with the first spline.

2. The vehicle drive transmission device according to claim 1, further comprising:
a cancel oil chamber and a lubricating oil path between the press member and the second support in the axial direction,
the cancel oil chamber being configured to create a hydraulic pressure for counteracting a centrifugal hydraulic pressure created in an operating oil chamber configured to receive oil for operating the press member,
the lubricating oil path being configured to supply oil to an inner circumferential portion of the second support from the inner side in the radial direction, wherein
the body separates the cancel oil chamber and the lubricating oil path from each other.

3. A vehicle drive device, comprising:
a rotary electric machine including a stator and a rotor on the inner side of the stator in the radial direction to serve as a driving source for a wheel; and
a vehicle drive transmission device according to claim 2, wherein
the vehicle drive transmission device further includes a rotor support supporting the rotor,
the rotor support includes:
a cylindrical portion extending in the axial direction and supporting the rotor from the inner side in the radial direction; and
a flange portion extending in the radial direction on the inner side of the cylindrical portion in the radial direction and coupled to the cylindrical portion,
the cylindrical portion is on the outer side of the friction clutch device in the radial direction, and
the flange portion is on a second side of the friction clutch device in the axial direction, the second side being opposite to the first side in the axial direction.

4. The vehicle drive transmission device according to claim 2, wherein
the press member is slidable in the axial direction on the second support or a slide reference member configured to rotate integrally with the second support, and
the press member is slidable on the slide reference member at a portion with a gap filled with a seal member.

5. A vehicle drive device, comprising:
a rotary electric machine including a stator and a rotor on the inner side of the stator in the radial direction to serve as a driving source for a wheel; and
a vehicle drive transmission device according to claim 4, wherein
the vehicle drive transmission device further includes a rotor support supporting the rotor,
the rotor support includes:
a cylindrical portion extending in the axial direction and supporting the rotor from the inner side in the radial direction; and a flange portion extending in the radial direction on the inner side of the cylindrical portion in the radial direction and coupled to the cylindrical portion, the cylindrical portion is on the outer side of the friction clutch device in the radial direction, and the flange portion is on a second side of the friction clutch device in the axial direction, the second side being opposite to the first side in the axial direction.

6. The vehicle drive transmission device according to claim 1, wherein the press member is slidable in the axial direction on the second support or a slide reference member configured to rotate integrally with the second support, and the press member is slidable on the slide reference member at a portion with a gap filled with a seal member.

7. A vehicle drive device, comprising:

a rotary electric machine including a stator and a rotor on the inner side of the stator in the radial direction to serve as a driving source for a wheel; and a vehicle drive transmission device according to claim 6, wherein the vehicle drive transmission device further includes a rotor support supporting the rotor, the rotor support includes:

a cylindrical portion extending in the axial direction and supporting the rotor from the inner side in the radial direction; and a flange portion extending in the radial direction on the inner side of the cylindrical portion in the radial direction and coupled to the cylindrical portion, the cylindrical portion is on the outer side of the friction clutch device in the radial direction, and the flange portion is on a second side of the friction clutch device in the axial direction, the second side being opposite to the first side in the axial direction.

8. A vehicle drive device, comprising:

a rotary electric machine including a stator and a rotor on the inner side of the stator in the radial direction to serve as a driving source for a wheel; and a vehicle drive transmission device according to claim 1, wherein the vehicle drive transmission device further includes a rotor support supporting the rotor, the rotor support includes:

a cylindrical portion extending in the axial direction and supporting the rotor from the inner side in the radial direction; and a flange portion extending in the radial direction on the inner side of the cylindrical portion in the radial direction and coupled to the cylindrical portion, the cylindrical portion is on the outer side of the friction clutch device in the radial direction, and the flange portion is on a second side of the friction clutch device in the axial direction, the second side being opposite to the first side in the axial direction.

9. A vehicle drive transmission device, comprising:

a first friction plate and a second friction plate arranged in an axial direction;

a friction clutch device including a press member configured to press the first friction plate and the second friction plate in the axial direction;

a first support supporting the first friction plate from an outer side in a radial direction; and a second support supporting the second friction plate from an inner side of the second support in the radial direction, wherein the first support is open toward a first side in the axial direction, the second support includes:

a cylindrical support section extending in the axial direction and supporting the second friction plate; and a radial extension section extending in the radial direction on an inner side of the cylindrical support section in the radial direction and coupled to the cylindrical support section, the press member is at such a position as to press the first friction plate and the second friction plate from the first side in the axial direction, the second support further includes a protrusion protruding from the cylindrical support section toward the first side in the axial direction, the press member has an insertion hole extending through the press member in the axial direction and configured to receive the protrusion, and the cylindrical support section, the radial extension section and the protrusion are integrally formed.

10. A vehicle drive device, comprising:

a rotary electric machine including a stator and a rotor on the inner side of the stator in the radial direction to serve as a driving source for a wheel; and a vehicle drive transmission device according to claim 9, wherein the vehicle drive transmission device further includes a rotor support supporting the rotor, the rotor support includes:

a cylindrical portion extending in the axial direction and supporting the rotor from the inner side in the radial direction; and a flange portion extending in the radial direction on the inner side of the cylindrical portion in the radial direction and coupled to the cylindrical portion, the cylindrical portion is on the outer side of the friction clutch device in the radial direction, and the flange portion is on a second side of the friction clutch device in the axial direction, the second side being opposite to the first side in the axial direction.

11. The vehicle drive transmission device according to claim 9, wherein the press member is slidable in the axial direction on the second support or a slide reference member configured to rotate integrally with the second support, and the press member is slidable on the slide reference member at a portion with a gap filled with a seal member.

12. A vehicle drive device, comprising:

a rotary electric machine including a stator and a rotor on the inner side of the stator in the radial direction to serve as a driving source for a wheel; and a vehicle drive transmission device according to claim 11, wherein the vehicle drive transmission device further includes a rotor support supporting the rotor, the rotor support includes:

a cylindrical portion extending in the axial direction and supporting the rotor from the inner side in the radial direction; and a flange portion extending in the radial direction on the inner side of the cylindrical portion in the radial direction and coupled to the cylindrical portion, the cylindrical portion is on the outer side of the friction clutch device in the radial direction, and the flange portion is on a second side of the friction clutch device in the axial direction, the second side being opposite to the first side in the axial direction.

\* \* \* \* \*